United States Patent
Fujimoto

(10) Patent No.: US 7,231,315 B2
(45) Date of Patent: Jun. 12, 2007

(54) DISTRIBUTION GOODNESS-OF-FIT TEST DEVICE, CONSUMABLE GOODS SUPPLY TIMING JUDGMENT DEVICE, IMAGE FORMING DEVICE, DISTRIBUTION GOODNESS-OF-FIT TEST METHOD AND DISTRIBUTION GOODNESS-OF-FIT TEST PROGRAM

(75) Inventor: Masakazu Fujimoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 241 days.

(21) Appl. No.: 11/002,146

(22) Filed: Dec. 3, 2004

(65) Prior Publication Data

US 2005/0283505 A1    Dec. 22, 2005

(30) Foreign Application Priority Data

Jun. 21, 2004  (JP)  ............................ 2004-183148

(51) Int. Cl.
  *G06F 7/00*  (2006.01)
(52) U.S. Cl. ...................... 702/170; 702/179; 702/181; 704/240; 704/241
(58) Field of Classification Search ................ 702/170, 702/179, 181; 704/240, 241
  See application file for complete search history.

(56) References Cited

U.S. PATENT DOCUMENTS

| | | | | |
|---|---|---|---|---|
| 4,718,094 A | * | 1/1988 | Bahl et al. | 704/256 |
| 4,736,437 A | * | 4/1988 | Sacks et al. | 382/216 |
| 4,805,219 A | * | 2/1989 | Baker et al. | 704/241 |
| 4,972,082 A | * | 11/1990 | Loomis et al. | 250/269.4 |
| 5,121,443 A | * | 6/1992 | Tomlinson | 382/156 |
| 6,192,103 B1 | * | 2/2001 | Wormington et al. | 378/73 |
| 6,260,013 B1 | * | 7/2001 | Sejnoha | 704/240 |
| 6,433,710 B1 | * | 8/2002 | Heavens et al. | 341/107 |
| 6,434,488 B1 | * | 8/2002 | Robson | 702/19 |
| 6,631,647 B2 | * | 10/2003 | Seale | 73/789 |
| 6,714,941 B1 | * | 3/2004 | Lerman et al. | 707/103 R |
| 6,868,380 B2 | * | 3/2005 | Kroeker | 704/240 |
| 6,944,602 B2 | * | 9/2005 | Cristianini | 706/12 |
| 7,010,483 B2 | * | 3/2006 | Rajan | 704/228 |
| 2003/0009399 A1 | * | 1/2003 | Boerner | 705/35 |
| 2003/0151000 A1 | * | 8/2003 | Watanabe et al. | 250/459.1 |
| 2003/0176931 A1 | * | 9/2003 | Pednault et al. | 700/31 |

FOREIGN PATENT DOCUMENTS

JP    2693435 B2    9/1997
JP    2003-281116 A   10/2003

* cited by examiner

*Primary Examiner*—Carol S. W. Tsai
(74) *Attorney, Agent, or Firm*—Sughrue Mion, PLLC

(57) ABSTRACT

A distribution goodness-of-fit test device for testing whether measured data matches an estimated probability distribution has a counting section determination unit, a counting unit and a goodness-of-fit test unit. The counting section determination unit determines according to the number of the measured data, widths of counting sections for counting the measured data. The counting unit counts the numbers of data in the respective determined counting sections. Also, the goodness-of-fit test unit performs a goodness-of-fit test based on the numbers of data in the respective counting sections.

22 Claims, 15 Drawing Sheets

POISSON DISTRIBUTION GOODNESS-OF-FIT TEST

DISTRIBUTION GOODNESS-OF-FIT TEST DEVICE: 1

NUMBER OF SPEECHES AND EXPECTED FREQUENCY
($\lambda$=2.115671642)

NUMBER OF SPEECHES AND EXPECTED FREQUENCY
($\lambda$=4.231343284)

DISTRIBUTION GOODNESS-OF-FIT TEST DEVICE, CONSUMABLE GOODS SUPPLY TIMING JUDGMENT DEVICE, IMAGE FORMING DEVICE, DISTRIBUTION GOODNESS-OF-FIT TEST METHOD AND DISTRIBUTION GOODNESS-OF-FIT TEST PROGRAM

BACKGROUND OF THE INVENTION

1. Field of the Invention

The present invention relates to a distribution goodness-of-fit test device for judging based on approximation to a chi-square distribution whether measured data follows a discrete distribution such as a binomial distribution or a Poisson distribution 2. Description of the Related Art Conventionally, as to whether or not data obtained by measurement follows a discrete distribution such as a binomial distribution or a Poisson distribution, there is used a chi-square goodness-of-fit test for testing the goodness of fit by approximation to a chi-square distribution. In this test method, as to whether or not the transaction of persons, cars, packets or the like arriving at constant intervals follows a multinomial distribution, the goodness of fit is tested by approximation to the chi-square distribution.

A method of the goodness-of-fit test to the Poisson distribution by using the chi-square distribution will be described by use of a specific example. Table 1 shows the result of checking the arrival number of calls received by a certain telephone line on a weekday for 30 days. Table 2 is a table obtained by classifying this according to the arrival number.

In a conventional goodness-of-fit test of a Poisson distribution by using a chi-square distribution, first, an arrival rate is estimated as $\Sigma$ (arrival number×observed frequency)/(total observed frequency). Table 2 shows values of multiplication of arrival numbers and observed frequencies. Since the multiplication values added together make 150, it is divided by 30 of the total observed frequency, and the arrival rate $\lambda$ is estimated as 5. FIG. 1 shows a graph in which a Poisson distribution with the arrival rate $\lambda=5$ and observed values actually observed are overlapped with each other and are indicated. Incidentally, the arrival rate is the average value of the arrival number of arrivals per unit time, and corresponds to the average value of the Poisson distribution.

Next, an expected frequency is obtained from the estimated arrival rate. When the arrival rate is estimated, the distribution shape of the Poisson distribution is determined from this arrival rate. The expected frequency is a value of an observed frequency on the estimated Poisson distribution. For example, in the observed data shown in Table 1, although the time when the arrival number is 4 is observed twice, the expected frequency of the arrival number 4 on the Poisson distribution is 5.264021093. The expected frequency can be obtained by a following mathematical expression 1. Table 2 shows the expected frequencies at the respective arrival numbers.

$$\text{total observed frequency} \times \left( \frac{1}{e^\lambda} \cdot \frac{\lambda^x}{x!} \right) = 30 \left( \frac{1}{e^5} \cdot \frac{5^x}{5!} \right) \quad (1)$$

Next, a test statistic is obtained by using a mathematical expression (2) set forth below. Where, $X_i$ denotes an observed frequency in a counting section i of the arrival number, and Ei denotes an expected frequency in the counting section i of the arrival number. The counting sections in which the expected frequency is 1 or more are not changed, and the counting sections in which the expected frequency is less than 1 are combined into one, and the total number of the counting sections is made m.

$$\chi_2^0 = \sum_{i=1}^{m} \frac{(x_i - E_i)^2}{E_i} \quad (2)$$

This test statistic is compared with a chi-square value $\chi^2(m-2, \alpha)$ with a degree of freedom of m-2, and when the test statistic is larger than the chi-square value $\chi^2(m-2, \alpha)$, it is judged that "the observed data does not follow the estimated Poisson distribution", and when the test statistic is smaller than the chi-square value $\chi^2(m-2, \alpha)$, it is judged

TABLE 1

| day | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| x | 6 | 3 | 3 | 5 | 3 | 5 | 5 | 4 | 5 | 6 | 7 | 1 | 8 | 5 | 5 |

| day | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|
| x | 5 | 10 | 8 | 3 | 5 | 4 | 7 | 8 | 3 | 6 | 3 | 3 | 3 | 9 | 2 |

TABLE 2

| arrival number | observed frequency | frequency × arrival number | expected frequency |
|---|---|---|---|
| 0 | 0 | 0 | 0.20213841 |
| 1 | 1 | 1 | 1.01069205 |
| 2 | 1 | 2 | 2.526730125 |
| 3 | 8 | 24 | 4.211216874 |
| 4 | 2 | 8 | 5.264021093 |
| 5 | 8 | 40 | 5.264021093 |
| 6 | 3 | 18 | 4.386684244 |
| 7 | 2 | 14 | 3.133345889 |
| 8 | 3 | 24 | 1.95834118 |
| 9 | 1 | 9 | 1.087967322 |
| 10 | 1 | 10 | 0.543983661 |
| 11 | 0 | 0 | 0.247265301 |
| 12 | 0 | 0 | 0.103027209 |
| total | 30 | 150 | | that "it can not be said that the observed data does not follow the estimated Poisson distribution". α represents a significant level.

In the foregoing example, the test statistic $\chi_0^2=9.208023<\chi^2(8, 0.05)=15.50731249$, and the test result is such that "it can not be said that the observed data does not follow the Poisson distribution".

Patent document 1 discloses a method of testing the goodness of fit of a software reliability growth curve by using the property of bugs of computer programs as a sequence statistic and censoring data.

Patent document 2 proposes a method of judging whether or not a difference in observation condition has an influence on the way of occurrence of an event by comparing two data obtained by observation performed the same number of times while the observation condition is changed.

[Patent document 1] Japanese Patent No. 2693435
[Patent document 2] JP-A-2003-281116

Unless the expected frequency is 10 or more, the test statistic for performing the approximation to the chi-square distribution becomes insufficient in accuracy. Thus, it is necessary that the number of data is made the number of classifications×10 or more. However, in the case where the number of classifications is large, there arises a problem that it takes time and cost to collect data. Further, since the observed data is not uniformly obtained in the respective classification sections, there is also a classification section in which even if the number of data is increased, the expected frequency does not become large. In this case, it becomes necessary to perform a processing of combining the classification in which the expected frequency is small, and there arises a problem that it takes time to perform the processing.

Besides, as is apparent from the diagram of trains or buses, a normal arrival rate (an average value of the arrival number of arrivals per unit time) is not constant, but follows a inhomogeneous Poisson process in which the arrival rate varies. However, in the inhomogeneous Poisson process, the distribution shape itself is changed in accordance with the change of the arrival rate, it has been impossible to apply the chi-square goodness-of-fit test as it is.

Patent documents 1 and 2 do not disclose techniques to solve the problems as stated above.

SUMMARY OF THE INVENTION

The present invention has been made in view of the above circumstances and provides a distribution goodness-of-fit test device in which a test possible range of a goodness-of-fit test is widened, a consumable goods supply timing judgment device, an image forming device, a distribution goodness-of-fit test method, and a distribution goodness-of-fit test program.

According to an aspect of the present invention, the distribution goodness-of-fit test device for testing whether measured data matches an estimated probability distribution includes a counting section determination unit which determines, according to the number of the measured data, widths of counting sections for counting the measured data, a counting unit which counts the numbers of data in the respective determined counting sections, and a goodness-of-fit test unit which perform a goodness-of-fit test using the numbers of data in the respective counting sections.

According to this invention, the widths of the counting sections for counting the data are determined according to the number of the measured data. Accordingly, even in the case where the number of data obtained by measurement is small, or even if there is a counting section in which the number of the obtained data is small, the widths of the counting sections are changed so that the test with high accuracy becomes possible. Thus, the test possible range of the goodness-of-fit test can be widened.

According to another aspect of the invention, the distribution goodness-of-fit test device for testing whether measured data matches an estimated probability distribution includes a counting section determination unit which determines, according to the estimated probability distribution, widths of counting sections for counting the measured data, a counting unit which counts the numbers of data in the respective determined counting sections, and a goodness-of-fit test unit which perform a goodness-of-fit test using the numbers of data in the respective counting sections.

According to this invention, the widths of the counting sections in which the measured data are counted are determined according to the measured probability distribution. When the widths of the counting sections are changed according to the estimated probability distribution so that for example, the probabilities of the respective counting sections on the estimated probability distribution become equal probabilities, it becomes possible to perform the goodness-of-fit test irrespective of the distribution shape of the probability distribution. Thus, it also becomes possible to perform the goodness-of-fit test for a probability distribution varying temporally, and the test possible range of the goodness-of-fit test can be widened.

According to another aspect of the invention, the distribution goodness-of-fit test device for testing whether measured data matches an estimated probability distribution includes a counting section determination unit which determines, according to the estimated probability distribution and the number of the measured data, distribution widths of counting sections for counting the measured data, a counting unit which counts the numbers of data in the respective determined counting sections, and a goodness-of-fit test unit which performs a goodness-of-fit test using the numbers of data in the respective counting sections.

According to this invention, the widths of the counting sections for counting the data are determined according to the number of the measured data and the estimated probability distribution. Since the widths of the counting sections are changed according to the number of the measured data, even in the case where the number of the data obtained by measurement is small, or even if there is a counting section in which the number of the obtained data is small, the widths of the counting sections are changed so that the test with high accuracy becomes possible. Besides, when the widths of the counting sections are changed according to the estimated probability distribution so that for example, the probabilities of the respective counting sections on the estimated probability distribution become equal probabilities, it becomes possible to perform the goodness-of-fit test irrespective of the distribution shape of the probability distribution. Thus, it also becomes possible to perform the goodness-of-fit test for a probability distribution varying temporally, and the test possible range of the goodness-of-fit test can be widened.

According to another aspect of the present invention, the consumable goods supply timing judgment device includes the foregoing distribution goodness-of-fit test device for performing a goodness-of-fit test from a measured consumption rate of consumable goods per unit time and an average value of a past consumption rate of the consumable goods per unit time, and a control unit which calculates an estimated supply time from a ratio of the present consumption rate of the consumable goods to the past consumption rate of the consumable goods and notifies an estimated time of supply in a case where it is judged by the goodness-of-fit test that there is a significant difference between the present consumption rate and the past consumption rate.

It is judged by the goodness-of-fit test whether there is a significant difference between the present consumption rate and the past consumption rate, and in the case where it is judged that there is a significant difference, the estimated supply time is calculated from the ratio of the present consumption rate of the consumable goods to the past consumption rate of the consumable goods, so that the estimated time of supply can be calculated with high accuracy.

According to another aspect of the present invention, the image forming device includes the foregoing consumable goods supply timing judgment device.

According to this invention, since the consumable goods supply timing judgment device is provided, the supply timing of toner, sheets or the like is judged with high accuracy, and the supply timing can be notified to the user.

According to another aspect of the present invention, the distribution goodness-of-fit test method for testing whether measured data matches an estimated probability distribution includes a counting section determination step of determining, according to the estimated probability distribution and the number of the measured data, widths of counting sections for counting the measured data, a counting step of counting the numbers of data in the respective determined counting sections, and a goodness-of-fit test step of performing a goodness-of-fit test using the numbers of data in the respective counting sections.

According to this invention, the widths of the counting sections for counting the data are determined according to the number of the measured data and the estimated probability distribution. Since the widths of the counting sections are changed according to the number of the measured data, even in the case where the number of the data obtained by measurement is small, or even if there is a counting section in which the number of the obtained data is small, the widths of the counting sections are changed so that the test with high accuracy becomes possible. Besides, when the widths of the counting sections are changed according to the estimated probability distribution so that for example, the probabilities of the respective counting sections on the estimated probability distribution become equal probabilities, it becomes possible to perform the goodness-of-fit test irrespective of the distribution shape of the probability distribution. Thus, it also becomes possible to perform the goodness-of-fit test for a probability distribution varying temporally, and the test possible range of the goodness-of-fit test can be widened.

According to another aspect of the present invention, a storage medium readable by a computer stores a distribution goodness-of-fit test program of instructions executable by the computer to perform a function for testing whether measured data matches an estimated probability distribution, the function comprising the steps of determining, according to the estimated probability distribution and the number of the measured data, widths of counting sections for counting the measured data, counting the numbers of data in the respective determined counting sections, and performing a goodness-of-fit test using the numbers of data in the respective counting sections.

According to this invention, the widths of the counting sections for counting the data are determined according to the number of the measured data and the estimated probability distribution. Since the widths of the counting sections are changed according to the number of the measured data, even in the case where the number of the data obtained by measurement is small, or even if there is a counting section in which the number of the obtained data is small, the widths of the counting sections are changed so that the test with high accuracy becomes possible. Besides, when the widths of the counting sections are changed according to the estimated probability distribution so that for example, the probabilities of the respective counting sections on the estimated probability distribution become equal probabilities, it becomes possible to perform the goodness-of-fit test irrespective of the distribution shape of the probability distribution. Thus, it also becomes possible to perform the goodness-of-fit test for a probability distribution varying temporally, and the test possible range of the goodness-of-fit test can be widened.

According to the present invention, the widths of the counting sections are changed, so that the test possible range of the goodness-of-fit test can be widened.

BRIEF DESCRIPTION OF THE DRAWINGS

Embodiments of the present invention will be described in detail based on the following figures, wherein.

DETAILED DESCRIPTION OF THE INVENTION

Embodiments of the present invention will be described with reference to the accompanying drawings.

[Embodiment 1]

Figure 1:
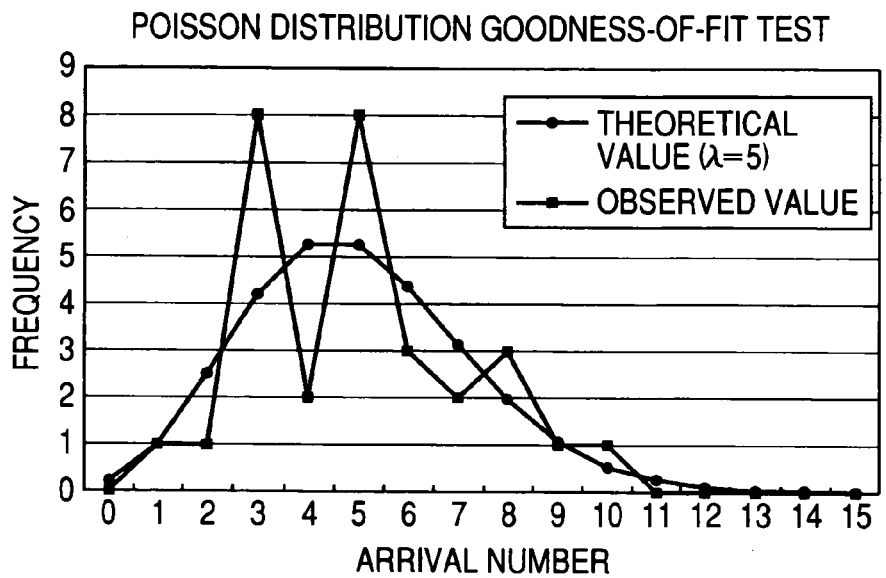
FIG. 1 is a view showing a graph in which a Poisson distribution with an arrival rate of 5 and observed data are overlapped and are indicated.
Figure 2:
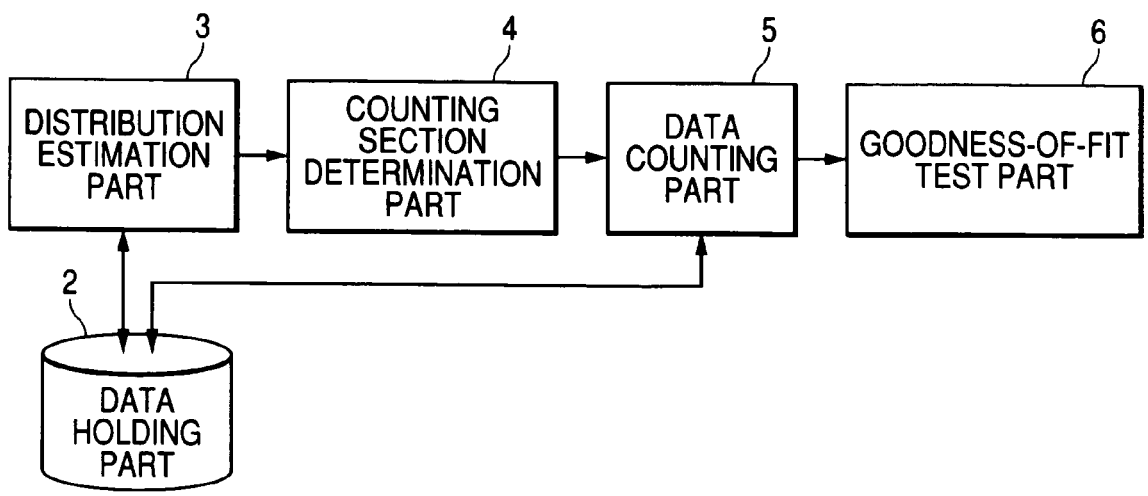
FIG. 2 is a block diagram showing a structure of a distribution goodness-of-fit test device 1 of an embodiment.

First, the structure of a distribution goodness-of-fit test device 1 will be described with reference to FIG. 2. As shown in FIG. 2, the distribution goodness-of-fit test device 1 includes a data holding part 2, a distribution estimation part 3, a counting section determination part 4, a data counting part 5, and a goodness-of-fit test part 6.

Data obtained by observation is recorded in the data holding part 2. The distribution estimation part 3 reads out the observed data from the data holding part 2 and estimates an arrival rate λ. The distribution estimation part 3 obtains an average arrival rate of the observed data for each time zone, and obtains a posting rate assumed to be proportional to the number of participants in a mailing list. Incidentally, the arrival rate λ is the average value of the number of arrivals per unit time, and corresponds to the average value of a Poisson distribution.

Figure 3:
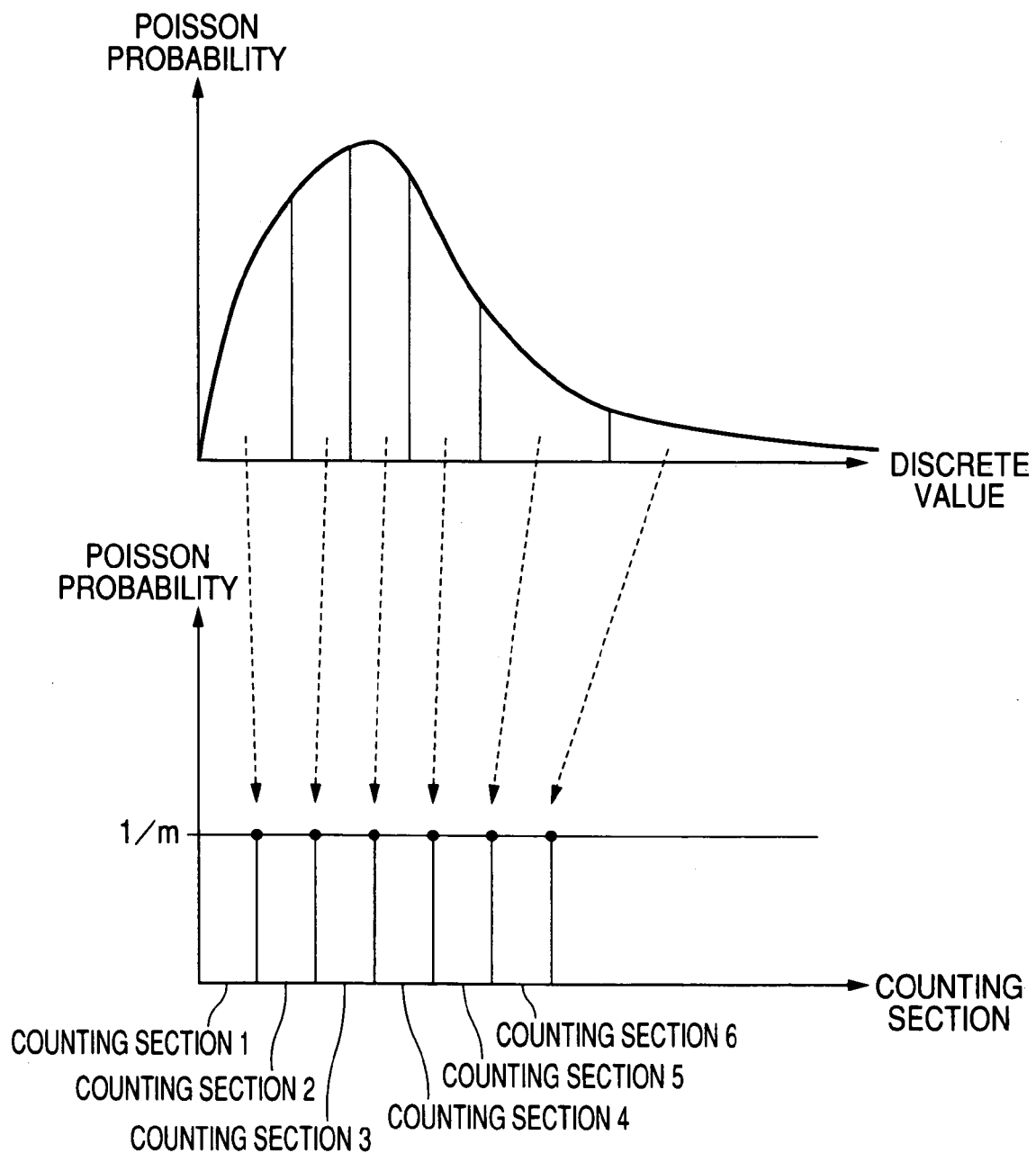
FIG. 3 is a view for explaining the principle of the invention.

When a discrete distribution is estimated by the distribution estimation part 3, as shown in FIG. 3, the counting section determination part 4 determines counting sections so that widths of the respective counting sections have equal probabilities on the estimated discrete distribution.

Figure 4:
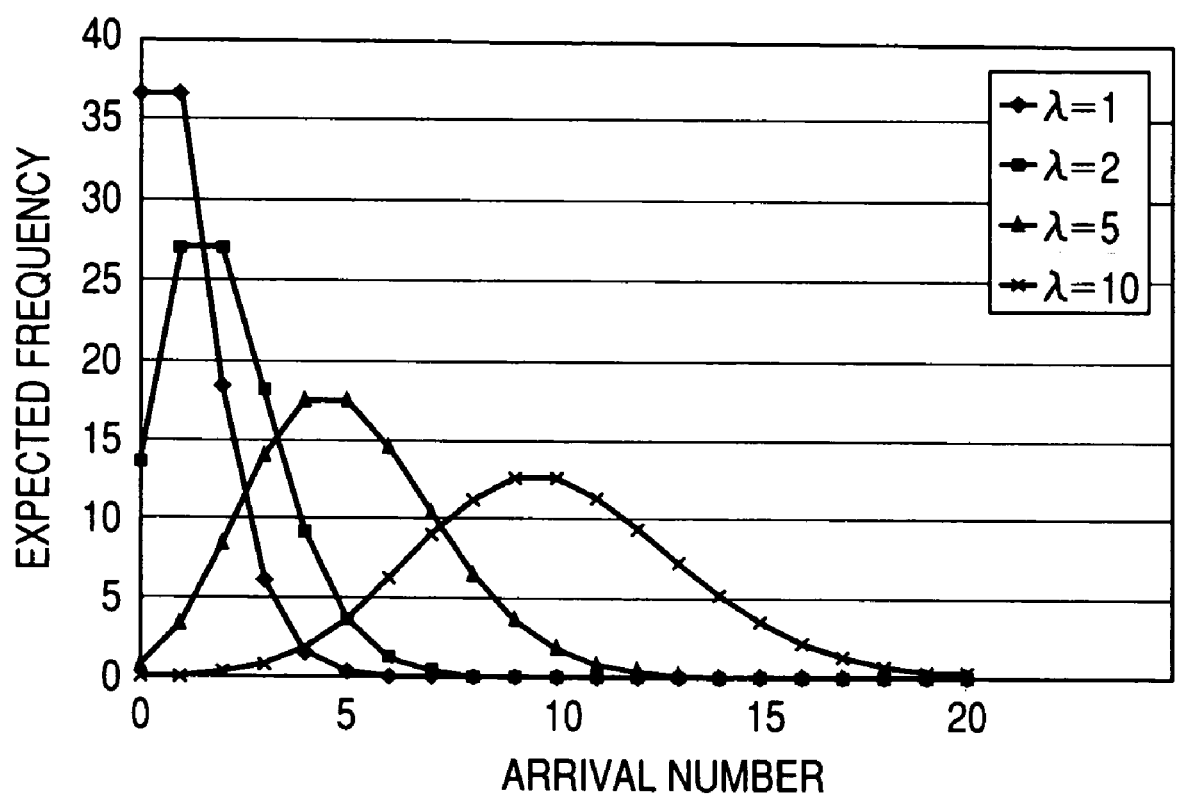
FIG. 4 is a view showing a change in distribution shapes due to a change in arrival rates.

In the case of a inhomogeneous Poisson process, the distribution shape is changed by the arrival rate λ. That is, the discrete distribution varies temporally. Thus, a chi-square goodness-of-fit test can not be applied as it is. FIG. 4 shows the shapes of Poisson distributions in the case where the arrival rate λ is 1, 2, 5 and 10. As shown in FIG. 4, when the arrival rate is changed, the shape of the Poisson distribution is also significantly changed. Then, as shown in FIG. 3, the counting sections are determined so that the widths of the respective counting sections have equal probabilities on the estimated discrete distribution, and the measured data is classified for each counting section. By this, the plural estimated discrete distributions can be converted into a discrete uniform distribution as shown in FIG. 3, and the chi-square goodness-of-fit test can be performed as the goodness-of-fit test to the uniform distribution. Accordingly, even if the distribution shape varies by the variation of the arrival rate λ, the chi-square goodness-of-fit test can be applied. Incidentally, in the case where the chi-square goodness-of-fit test is used, in order to raise the accuracy of approximation to the chi-square distribution, it is appropriate that the number m of the counting sections is made (the number of data/10) or less.

In the data counting part 5, the numbers of data in the respective counting sections determined by the counting section determination part 4 are counted. In the goodness-of-fit test part 6, a test method such as the chi-square goodness-of-fit test is used to test the counted data. The number of sections is made m, and a test statistic obtained from a mathematical expression set forth below is compared with a chi-square value $\chi^2(m-1, \alpha)$ with a degree of freedom of m−1. When the test statistic is larger than the chi-square value, it is judged that the data does not follow the estimated discrete distribution. Incidentally, $X_i$ denotes the number of data in an ith section, n denotes the total number of data, m denotes the number of sections, and α denotes a significance level. As the significance level α, 0.05 (5%) or 0.01 (1%) is used.

$$\chi_2^0 = \sum_{i=1}^{m} \frac{\left(x_i - \frac{n}{m}\right)^2}{\frac{n}{m}} \quad (3)$$

Figure 5:
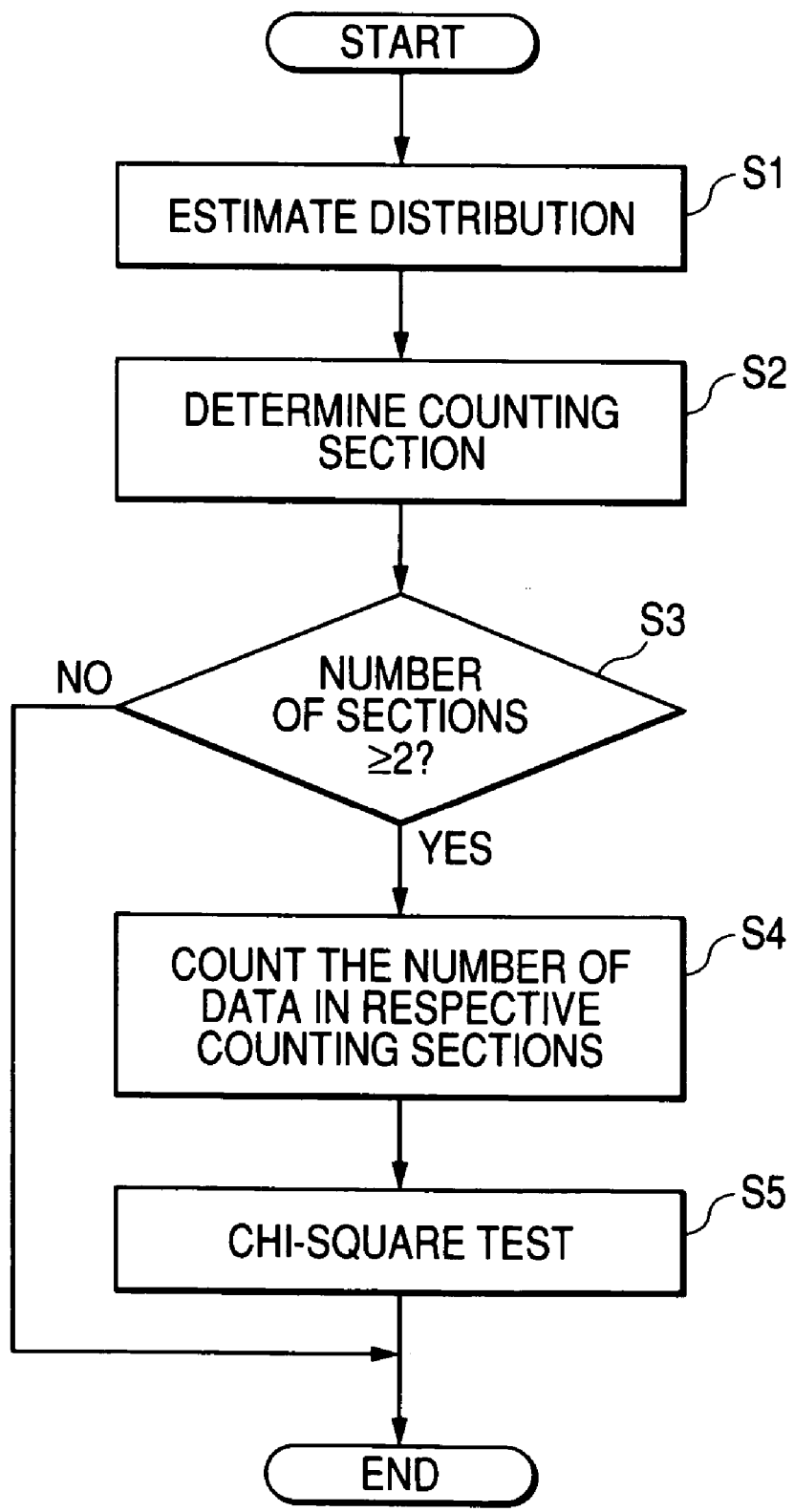
FIG. 5 is a flowchart showing an operation procedure of a distribution goodness-of-fit test device.
Figure 6:
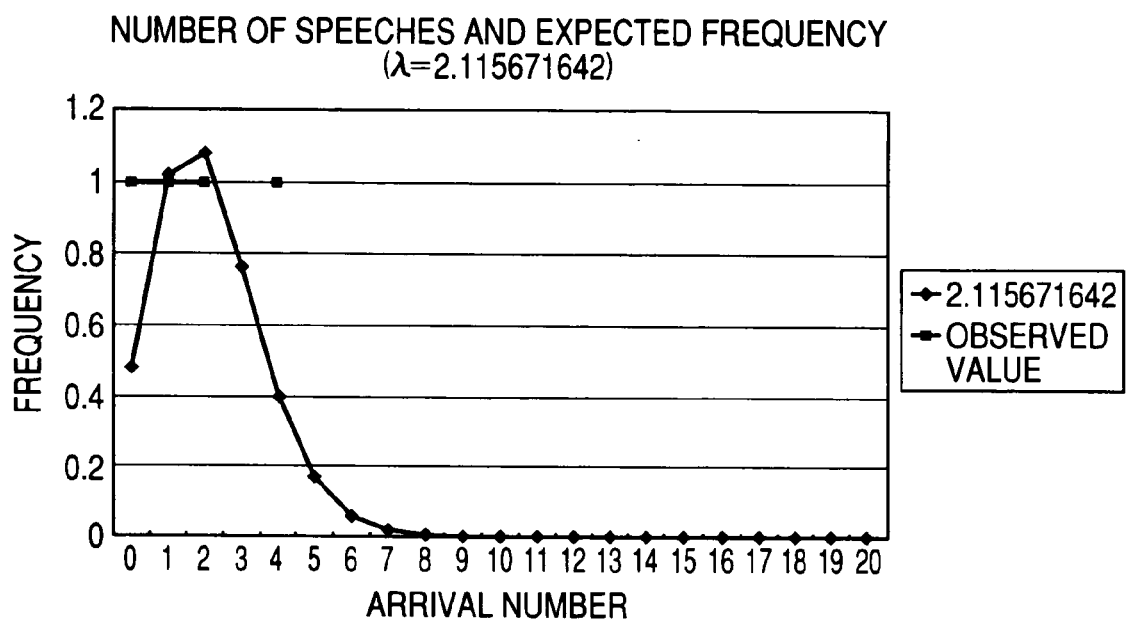
FIG. 6 is a view showing the shape of a Poisson distribution at an expected frequency $\lambda$, and observed values of observation estimated to follow the Poisson distribution and their frequencies.
Figure 7:
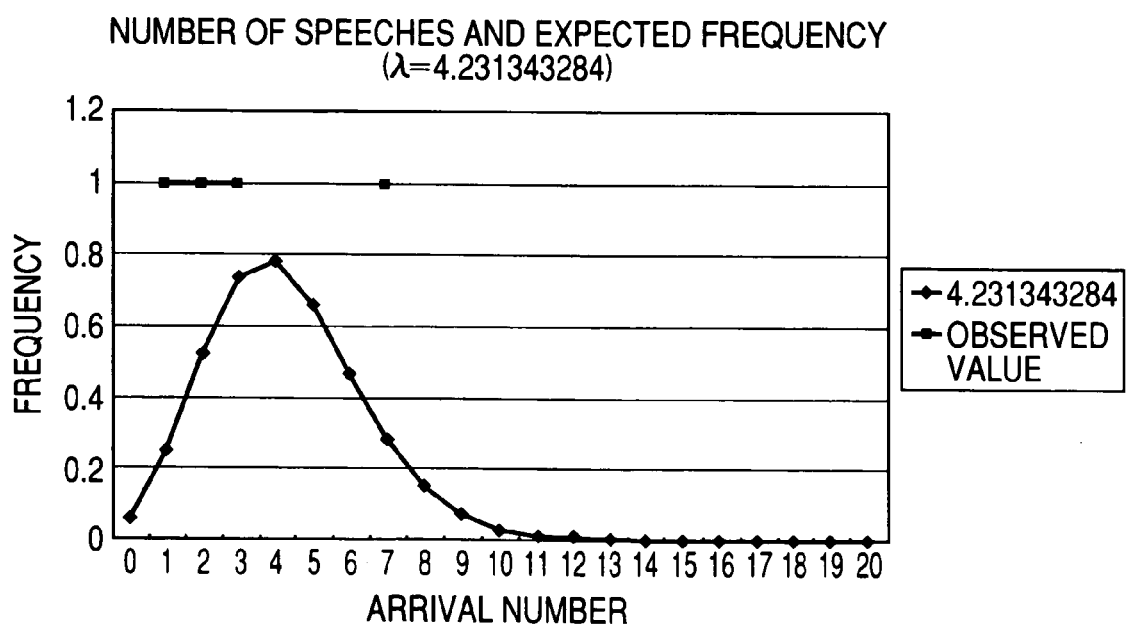
FIG. 7 is a view showing the shape of a Poisson distribution at an expected frequency $\lambda$, and observed values of observation estimated to follow the Poisson distribution and their frequencies.
Figure 8:
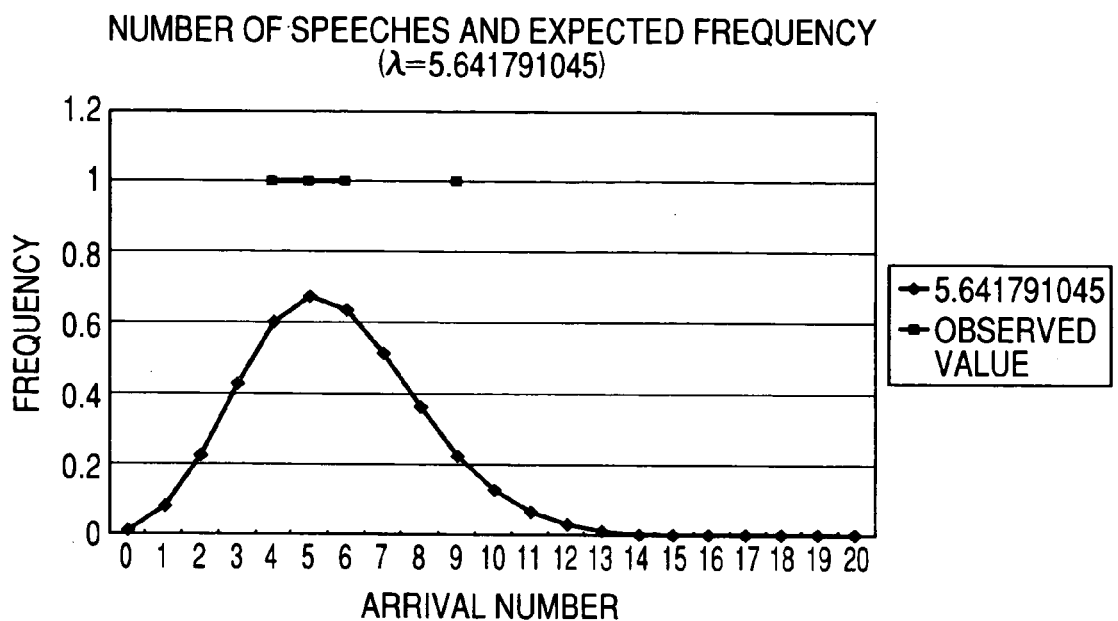
FIG. 8 is a view showing the shape of a Poisson distribution at an expected frequency $\lambda$, and observed values of observation estimated to follow the Poisson distribution and their frequencies.
Figure 9:
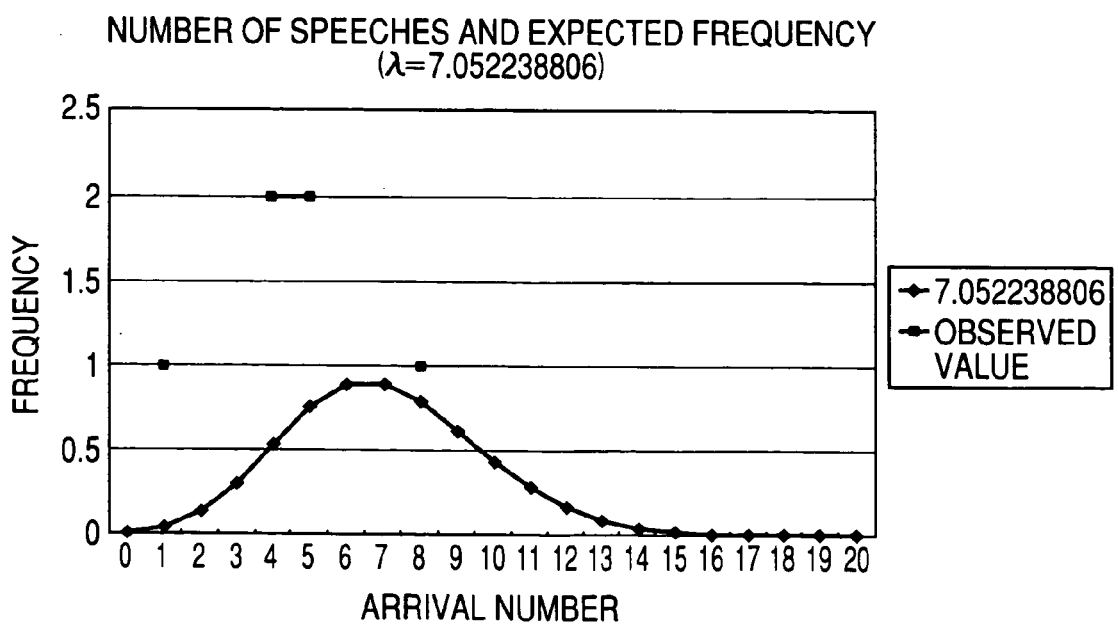
FIG. 9 is a view showing the shape of a Poisson distribution at an expected frequency $\lambda$, and observed values of observation estimated to follow the Poisson distribution and their frequencies.
Figure 10:
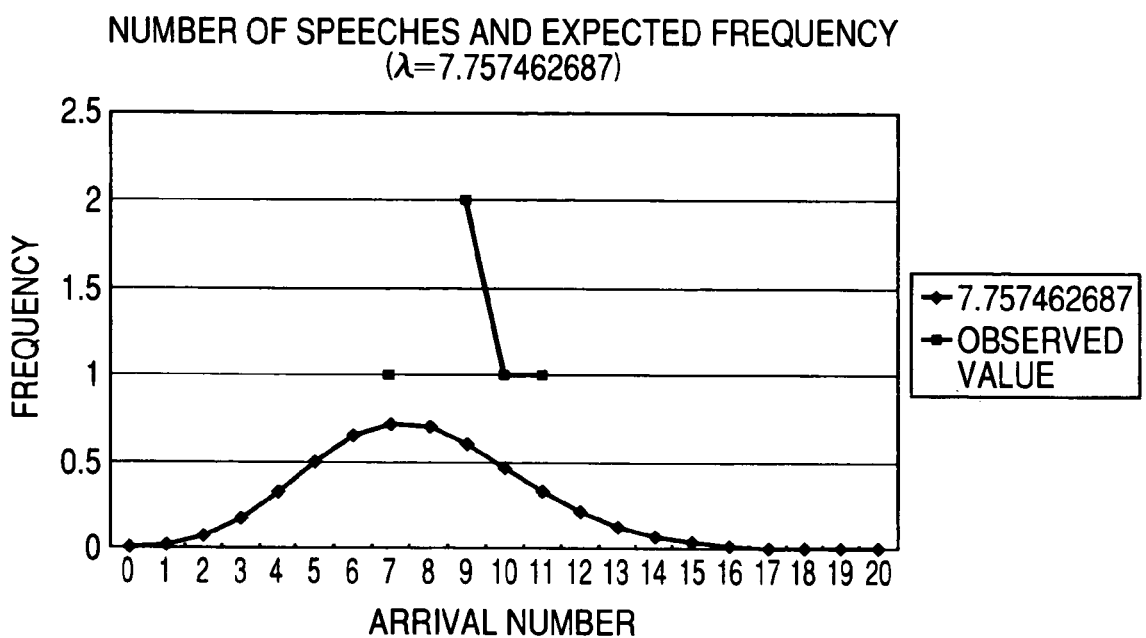
FIG. 10 is a view showing the shape of a Poisson distribution at an expected frequency $\lambda$, and observed values of observation estimated to follow the Poisson distribution and their frequencies.
Figure 11:
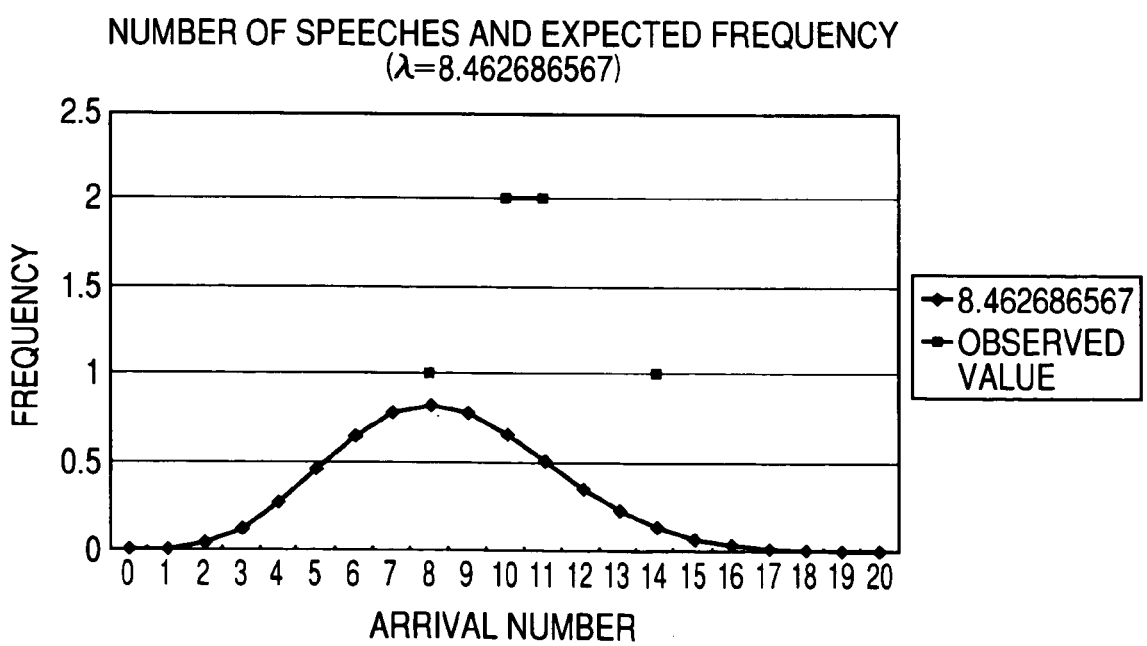
FIG. 11 is a view showing the shape of a Poisson distribution at an expected frequency $\lambda$, and observed values of observation estimated to follow the Poisson distribution and their frequencies.
Figure 12:
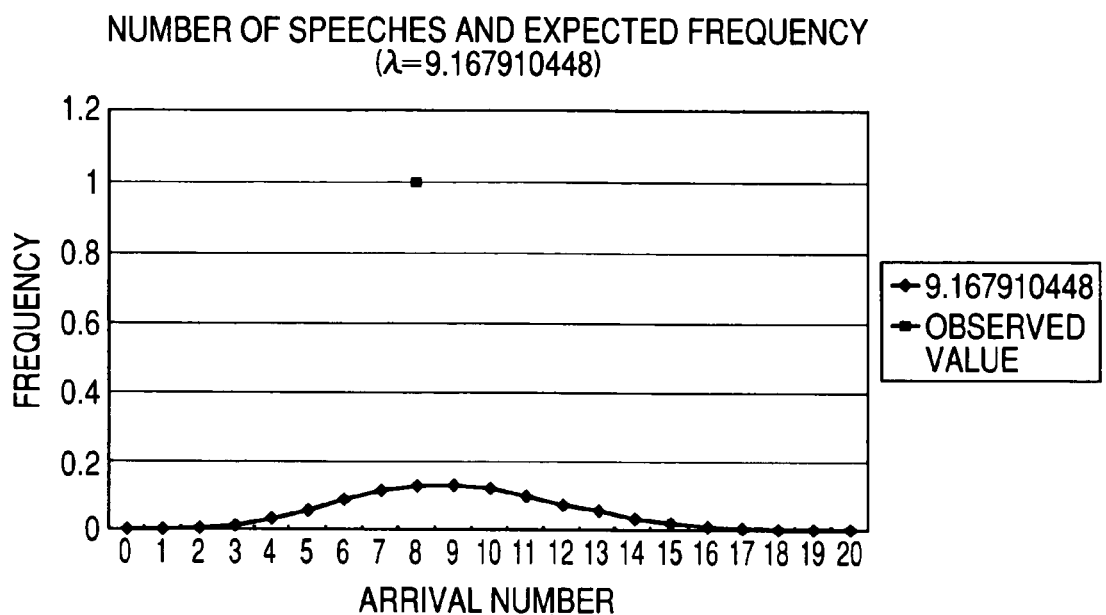
FIG. 12 is a view showing the shape of a Poisson distribution at an expected frequency $\lambda$, and observed values of observation estimated to follow the Poisson distribution and their frequencies.

Next, the processing procedure of the distribution goodness-of-fit test device will be described with reference to a flowchart shown in FIG. 5. In a distribution goodness-of-fit test estimation processing, first, a parameter (arrival rate) of a discrete distribution is estimated from an observed value or the like (step S1) In the case of a Poisson process (homogeneous Poisson process) in which the arrival rate is constant, estimation of the arrival rate λ is performed. In the case of an inhomogeneous Poisson process, estimation of the varying arrival rate λ is performed. For example, an average arrival rate of observed data of the inhomogeneous Poisson process for each time zone is obtained, or a posting rate assumed to be proportional to the number of participants in a mailing list is obtained.

Next, in a counting section determination processing, counting sections are determined so that the widths of the respective counting sections have equal probabilities on the estimated distribution (step S2). First, in order to determine the number of the counting sections, a natural number not larger than (observed frequency÷10) and not less than 2 is selected (step S3). Here, when the number of observed data is 19 or less, the number of sections becomes 1 (step S3/NO), and therefore, the test is not performed and is ended. In this case, it may be displayed or notified that the test is impossible.

When the number m of the counting sections is determined, the widths of the sections are determined so that expected values of the respective sections are equal, that is, they have equal probabilities. When the inhomogeneous Poisson process is cited as an example, the probability that the number of arrivals in a time width of from t to t+s becomes i is made $$P[N(t+s)-N(t)=i] \quad (4),$$

and as a section in which a cumulative probability from i=0 does not exceed 1/m, and a next section in which it does not exceed 1/m or a section in which a cumulative probability does not exceed 2/m, $k_1, k_2, \ldots, k_{m-1}$ of following expressions (5), (6), (7), (8), (9) or (10), (11), (12), (13) are determined.

$$p_1 = \sum_{i=0}^{k_1} P[N(t+s) - N(t) = i] \leq \frac{1}{m} \quad (5)$$

$$p_2 = \sum_{i=k_1+1}^{k_2} P[N(t+s) - N(t) = i] \leq \frac{1}{m} \quad (6)$$

$$p_j = \sum_{i=k_{j-1}+1}^{k_j} P[N(t+s) - N(t) = i] \leq \frac{1}{m} \quad (7)$$

$$p_{m-1} = \sum_{i=k_{m-2}+1}^{k_{m-1}} P[N(t+s) - N(t) = i] \leq \frac{1}{m} \quad (8)$$

$$p_m = 1 - \sum_{i=1}^{m-1} P_i \cong \frac{1}{m} \quad (9)$$

$$p_1 = \sum_{i=0}^{k_1} P[N(t+s) - N(t) = i] \leq \frac{1}{m} \quad (10)$$

$$\sum_{i=0}^{k_2} p_i = \sum_{i=0}^{k_2} P[N(t+s) - N(t) = i] \leq \frac{2}{m} \quad (11)$$

$$\sum_{i=0}^{k_j} p_i = \sum_{i=0}^{k_j} P[N(t+s) - N(t) = i] \leq \frac{j}{m} \quad (12)$$

$$\sum_{i=0}^{k_{m-1}} p_i = \sum_{i=0}^{k_{m-1}} P[N(t+s) - N(t) = i] \leq \frac{m-1}{m} \quad (13)$$

In a section data counting processing, the numbers of data in the respective determined counting sections are counted (step S4). In the chi-square test processing, the chi-square goodness-of-fit test is performed (sep S5). In the case of the chi-square goodness-of-fittest, the number of the sections is made m, and the test statistic is compared with the chi-square value $\lambda^2(m-1, \alpha)$ (step S5). When the test statistic is larger than the chi-square value, it is judged that the estimated distribution is not suitable.

As stated above, in this embodiment, even in the case where a sufficient number of data are not obtained as compared with the division number according to the division by a conventional discrete value, the division number can be decreased, and therefore, the test with high accuracy becomes possible. Besides, a discrete distribution varying temporally is converted into a uniform distribution of 1/m (m is the division number), so that the test can be performed also for the discrete distribution varying temporally. Thus, it is possible to easily statistically test whether the data follows the distribution function having a fluctuating parameter and estimated using the data after observation. By this, in the case where there is periodicity in variation for each time zone although there is a temporal change, it is possible to make a diagnosis of whether a large change occurs from a steady state.

Incidentally, when the foregoing method is not used, as long as an observation time interval is not changed at the time of counting, the goodness-of-fittest to a distribution function having a fluctuating parameter is difficult to perform. Since it is almost impossible to change the time interval while estimating the parameter at the time of observation, a method in which cost is high must be adopted, for example, a large amount of storage capacity is required to record continuously in time, or counting is again performed after the change of the parameter is estimated.

SPECIFIC EXAMPLE 1

Next, a specific example of a test using the foregoing distribution goodness-of-fit test method will be described. First, a description will be given to a case where statistical data which is shown in Table 1 and in which an arrival rate follows a specific Poisson distribution process is subjected to a goodness-of-fit test in accordance with the invention. Table 1 shows the number of calls received by a telephone line on a weekday. Table 3 set forth below shows the number x of arrivals on each day, a cumulative Poisson probability of the arrival number, and the number of the counting section classified in accordance with the invention. Table 4 shows a table in which the data are counted in accordance with the classification shown in Table 3.

TABLE 3

| x | | cumulative Poisson probability | classification |
|---|---|---|---|
| 1 | 6 | 0.762183463 | 3 |
| 2 | 3 | 0.265025915 | 1 |
| 3 | 3 | 0.265025915 | 1 |
| 4 | 5 | 0.615960655 | 2 |
| 5 | 3 | 0.265025915 | 1 |
| 6 | 5 | 0.615960655 | 2 |
| 7 | 5 | 0.615960655 | 2 |
| 8 | 4 | 0.440493285 | 2 |
| 9 | 5 | 0.615960655 | 2 |
| 10 | 6 | 0.762183463 | 3 |
| 11 | 7 | 0.866628326 | 3 |
| 12 | 1 | 0.040427682 | 1 |
| 13 | 8 | 0.931906365 | 3 |
| 14 | 5 | 0.615960655 | 2 |
| 15 | 5 | 0.615960655 | 2 |
| 16 | 5 | 0.615960655 | 2 |
| 17 | 10 | 0.986304731 | 3 |
| 18 | 8 | 0.931906365 | 3 |
| 19 | 3 | 0.265025915 | 1 |
| 20 | 5 | 0.615960655 | 2 |
| 21 | 4 | 0.440493285 | 2 |
| 22 | 7 | 0.866628326 | 3 |
| 23 | 8 | 0.931906365 | 3 |
| 24 | 3 | 0.265025915 | 1 |
| 25 | 6 | 0.762183463 | 3 |
| 26 | 3 | 0.265025915 | 1 |
| 27 | 3 | 0.265025915 | 1 |
| 28 | 3 | 0.265025915 | 1 |
| 29 | 9 | 0.968171943 | 3 |
| 30 | 2 | 0.124652019 | 1 |

TABLE 4

| classification | observed frequency | expected frequency |
|---|---|---|
| 1 | 10 | 10 |
| 2 | 10 | 10 |
| 3 | 10 | 10 |

First, the arrival rate $\lambda$ is obtained by $\Sigma$ (arrival number × observed frequency)/(total observed frequency) as described above and is made 5. Since the observed frequency is 30 in total, the number of classifications, that is, the number of counting sections is required to be made 30/10 or less from the accuracy of approximation to the chi-square distribution, and it is made 3.

The cumulative Poisson probability expresses a cumulative probability in which the number of messages is from 0 to k in the case where the Poisson process is presupposed, and the arrival number is made k. The cumulative Poisson probability is obtained from 0 to the value of each x shown in Table 3. For example, the cumulative Poisson probability in which the value of x is up to 3 becomes $$\frac{1}{e^5} \cdot \frac{5^0}{0!} + \frac{1}{e^5} \cdot \frac{5^1}{1!} + \frac{1}{e^5} \cdot \frac{5^2}{2!} + \frac{1}{e^5} \cdot \frac{5^3}{3!} = 0.26502591$$

With respect to the determination of the classified counting section, even if a separation between the counting sections in the estimated distribution is not directly calculated, when the cumulative Poisson probability is calculated, an integer portion of a value obtained by adding 1 to cumulative Poisson probability×number of sections becomes the number of the section.

As shown in Table 4, the result of the judgment becomes $\chi^2(3-1, 0.05)=5.991476357>0$, and similarly to the conventional method, the result is such that "it can not be said that the data does not follow the Poisson distribution", and even in the case where there is no variation in arrival rate, a contradiction does not occur.

SPECIFIC EXAMPLE 2

As a specific example 2, a description will be given to an example in which it is tested whether the number of new messages of a mailing list for each week follows an inhomogeneous Poisson process. In the mailing list, it is conceivable that as the number of persons becomes large, the number of messages increases. Thus, a check is made for the case in which it is assumed that the posting rate (arrival rate), that is, the average number of messages varies in proportion to the number of participants. However, since a response is significantly influenced by a former message, a new message is made an object. The number of registrants in each week and the number of messages are known, and it is tested whether the occurrence rate (arrival rate) of messages matches the inhomogeneous Poisson process in proportion to the number of registrants. Table 5 is a table in which the number of messages, the number of registrants, the expected value and the cumulative Poisson probability are collected in each week.

TABLE 5

| number of messages | number of registrants | expected value | cumulative probability | classification |
|---|---|---|---|---|
| 1 | 4 | 30 | 2.115671642 | 0.936307752 | 3 |
| 2 | 2 | 30 | 2.115671642 | 0.645401408 | 2 |
| 3 | 1 | 30 | 2.115671642 | 0.375601365 | 2 |
| 4 | 0 | 30 | 2.115671642 | 0.120552294 | 1 |
| 5 | 3 | 60 | 4.231343284 | 0.389625748 | 2 |
| 6 | 2 | 60 | 4.231343284 | 0.206126414 | 1 |
| 7 | 7 | 60 | 4.231343284 | 0.933884263 | 3 |
| 8 | 1 | 60 | 4.231343284 | 0.076026357 | 1 |
| 9 | 6 | 80 | 5.641791045 | 0.663628706 | 2 |
| 10 | 9 | 80 | 5.641791045 | 0.938534165 | 3 |
| 11 | 5 | 80 | 5.641791045 | 0.504784723 | 2 |
| 12 | 4 | 80 | 5.641791045 | 0.335855408 | 2 |
| 13 | 5 | 100 | 7.052238806 | 0.294086357 | 1 |
| 14 | 5 | 100 | 7.052238806 | 0.294086357 | 1 |
| 15 | 1 | 100 | 7.052238806 | 0.006968964 | 1 |
| 16 | 4 | 100 | 7.052238806 | 0.168279184 | 1 |
| 17 | 4 | 100 | 7.052238806 | 0.168279184 | 1 |
| 18 | 8 | 100 | 7.052238806 | 0.722255536 | 1 |

TABLE 5-continued

| number of messages | number of registrants | expected value | cumulative probability | classification |
|---|---|---|---|---|
| 19 | 9 | 110 | 7.757462687 | 0.746224814 | 3 |
| 20 | 9 | 110 | 7.757462687 | 0.746224814 | 3 |
| 21 | 7 | 110 | 7.757462687 | 0.487296495 | 3 |
| 22 | 11 | 110 | 7.757462687 | 0.904784248 | 2 |
| 23 | 10 | 110 | 7.757462687 | 0.83920934 | 3 |
| 24 | 11 | 120 | 8.462686567 | 0.851827371 | 3 |
| 25 | 8 | 120 | 8.462686567 | 0.528241441 | 3 |
| 26 | 11 | 120 | 8.462686567 | 0.851827371 | 2 |
| 27 | 10 | 120 | 8.462686567 | 0.764767283 | 3 |
| 28 | 14 | 120 | 8.462686567 | 0.973458881 | 3 |
| 29 | 10 | 120 | 8.462686567 | 0.767467283 | 3 |
| 30 | 8 | 130 | 9.167910448 | 0.433744878 | 2 |

In the case where it is assumed that the occurrence rate (arrival rate) of message is proportional to the number of registrants, the expected value indicates an expected value of the number of messages calculated from the number of registrants. A computation expression is as follows.

expected value=(total number of messages)×(number of registrants at that time)/(total number of registrants)

In the case where the Poisson probability is presupposed, the number of messages is made k, and the cumulative Poisson probability indicates a cumulative probability in which the number of messages is from 0 to k. In this example, since the expected value, that is, the arrival rate λ varies, the Poisson distribution also varies in accordance with this. Thus, also with respect to the cumulative probability, the Poisson distribution corresponding to the expected value (arrival rate) is obtained, and the cumulative probability must be obtained from this distribution.

With respect to the calculation of the counting section to be classified, it is obtained by multiplying the value of the cumulative Poisson probability by the number of sections and adding 1. The division number is determined on the basis of the total number of data. When the expected frequency becomes 10 or more, since it may be approximated to the chi-square distribution practically, the maximum value of the division number is made (number of data/10). In this example, the total number of data is 30, and from the division number≦3.0, the division number is made 3.

When the division number is made 3 and the chi-square test is performed, Table 6 below is obtained.

TABLE 6

| classification | observed frequency | expected frequency | $(X_i - n/m)^2 \div (n/m)$ |
|---|---|---|---|
| 1 | 8 | 10 | 0.4 |
| 2 | 9 | 10 | 0.1 |
| 3 | 13 | 10 | 0.9 |
| total | 30 | 30 | 1.4 |

Since it is premised that the expected frequency has equal probability, it is the total number of cases÷the number of classifications (number of counting sections) and is 10. Here, $X_i$ is made each observed frequency, the sum of $$(X_i - n/m)^2/(n/m)$$

is made a test statistic, and the goodness of fit is tested by making a comparison with a chi-square value. In this example, since it becomes $\chi^2(3-1, 0.05)=5.991476357>1.4$, it is possible to judge that the data matches the inhomogeneous Poisson process. In this way, it is possible to test whether or not the data already counted at constant time intervals match the inhomogeneous Poisson process.

Figure 13:
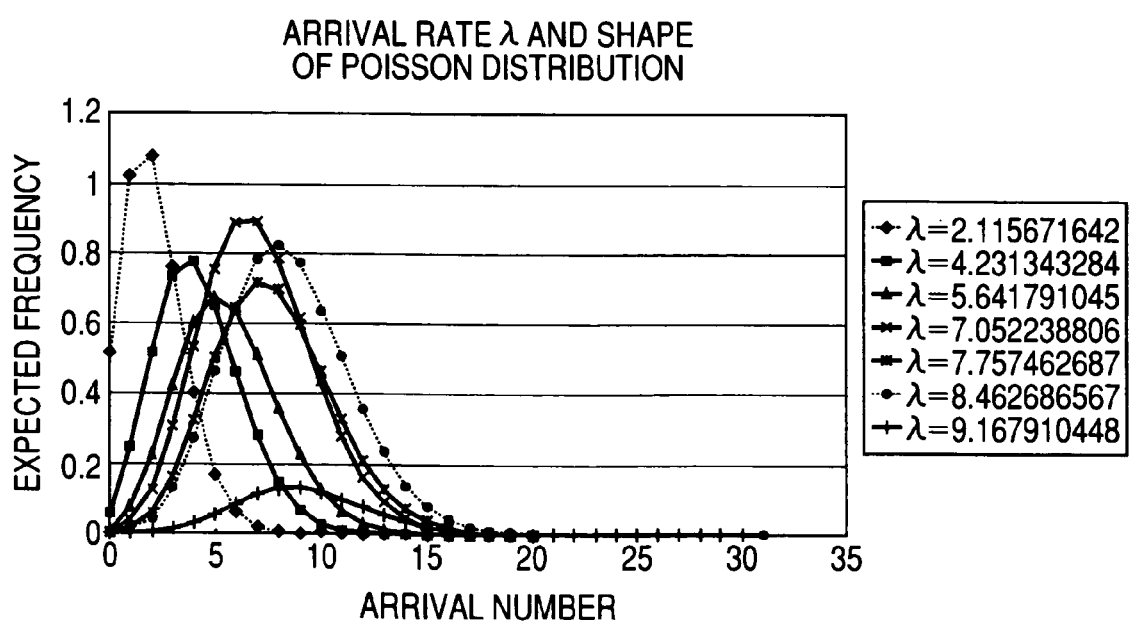
FIG. 13 is a view showing the shapes of the Poisson distributions at the respective expected frequencies collectively.
Figure 14:
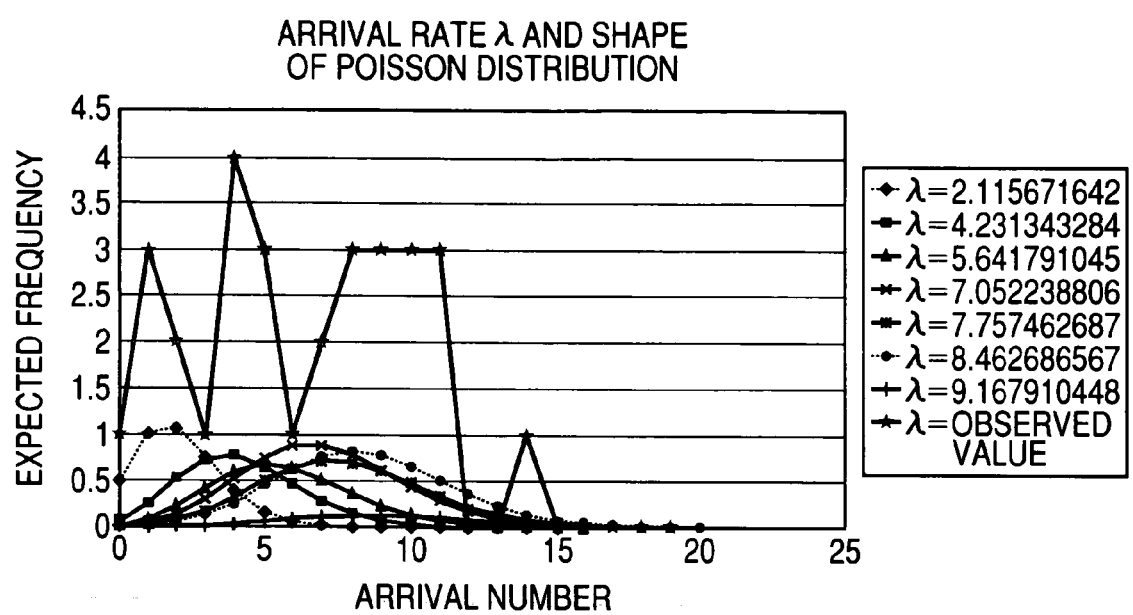
FIG. 14 is a view showing the shapes of the Poisson distributions at the respective expected frequencies collectively.

Incidentally, FIGS. 6 to 12 show the shapes of Poisson distributions at respective expected frequencies $\lambda$, and observed values of observation estimated to follow the Poisson distributions and their frequencies. FIGS. 13 and 14 collectively show the shapes of the Poisson distributions at the respective expected frequencies in FIGS. 6 to 12.

SPECIFIC EXAMPLE 3

As a specific example 3, a description will be given to an example in which it is tested whether the degree of use of a printer follows the inhomogeneous Poisson process based on the number of attended persons. Also with respect to the degree of use of the printer, it is conceivable that as the number of persons becomes large, the number of outputs increases. Thus, it is assumed that the average number of times of output varies in proportion to the number of attended persons. Here, the average number of attended persons and the number of outputs for each working time on a weekday are known, and it is tested whether or not the occurrence rate of the output matches the inhomogeneous Poisson process in proportion to the number of attended persons. Table 7 is a table in which the number of outputs, the number of attended persons, the expected value, and the cumulative Poisson probability are collected in each week.

TABLE 7

| | number of outputs | number of attended persons | expected value | cumulative probability | classification |
|---|---|---|---|---|---|
| 1 | 11 | 80 | 7.283154122 | 0.932809438 | 3 |
| 2 | 4 | 50 | 4.551971326 | 0.522268318 | 2 |
| 3 | 0 | 30 | 2.731182796 | 0.065142194 | 1 |
| 4 | 3 | 25 | 2.275985663 | 0.804211299 | 3 |
| 5 | 2 | 30 | 2.731182796 | 0.486016955 | 2 |
| 6 | 2 | 35 | 3.186379928 | 0.382753538 | 2 |
| 7 | 3 | 40 | 3.641577061 | 0.506413382 | 2 |
| 8 | 5 | 60 | 5.462365591 | 0.535380044 | 2 |
| 9 | 6 | 80 | 7.283154122 | 0.408427795 | 2 |
| 10 | 1 | 35 | 3.186379928 | 0.172986184 | 1 |
| 11 | 6 | 80 | 7.283154122 | 0.408427795 | 2 |
| 12 | 7 | 50 | 4.551971326 | 0.909071299 | 3 |
| 13 | 2 | 30 | 2.731182796 | 0.486016955 | 2 |
| 14 | 1 | 25 | 2.275985663 | 0.336429429 | 2 |
| 15 | 4 | 30 | 2.731182796 | 0.858232777 | 3 |
| 16 | 2 | 35 | 3.186379928 | 0.382753538 | 2 |
| 17 | 1 | 40 | 3.641577061 | 0.121660261 | 1 |
| 18 | 7 | 60 | 5.462365591 | 0.81410721 | 3 |
| 19 | 13 | 80 | 7.283154122 | 0.982658332 | 3 |
| 20 | 3 | 35 | 3.186379928 | 0.605553033 | 2 |
| 21 | 9 | 80 | 7.283154122 | 0.800662605 | 3 |
| 22 | 3 | 50 | 4.551971326 | 0.333603553 | 2 |
| 23 | 3 | 30 | 2.731182796 | 0.70720591 | 3 |
| 24 | 3 | 25 | 2.275985663 | 0.804211299 | 3 |
| 25 | 1 | 30 | 2.731182796 | 0.243057434 | 1 |
| 26 | 3 | 35 | 3.186379928 | 0.605553033 | 2 |
| 27 | 4 | 40 | 3.641577061 | 0.6984703 | 3 |
| 28 | 6 | 60 | 5.462365591 | 0.691938616 | 3 |
| 29 | 10 | 80 | 7.283154122 | 0.880168316 | 3 |
| 30 | 2 | 35 | 3.186379928 | 0.382753538 | 2 |

The expected value shown in Table 7 indicates the expected value of the number of outputs calculated from the number of attended persons in the case where it is assumed that the occurrence rate (arrival rate) of the output is proportional to the number of attended persons. A calculation method is (total number of outputs)×(number of attended persons at that time point)/(total number of attended persons).

As described above, in the case where the Poisson process is presupposed, the number of outputs is made k, and the cumulative Poisson probability indicates the cumulative probability in which the number of outputs is from 0 to k. With respect to the classification, the counting section to be classified by multiplying the cumulative Poisson probability by the number of sections and adding 1 is calculated. The division number is determined on the basis of the total number of data. When the expected frequency becomes 10 or more, it may be approximated to the chi-square distribution practically, the maximum value of the division number is made (number of data/10). In this example, the total number of data is 30, and from the division number$\leq 3.0$, the division number is made 3.

When the division number is made 3, and the chi-square goodness-of-fit test is performed, Table 8 shown below is obtained.

TABLE 8

| classification | observed frequency | expected frequency | $(X_i - n/m)^2 \div (n/m)$ |
|---|---|---|---|
| 1 | 4 | 10 | 3.6 |
| 2 | 14 | 10 | 1.6 |
| 3 | 12 | 10 | 0.4 |
| total | 30 | 30 | 5.6 |

Since it is premised that the expected frequency has equal probability, it is the total number of cases÷the number of classifications (number of counting sections). Here, $X_i$ is made each observed frequency, the total of $$(X_i - n/m)^2/(n/m)$$

is made a test statistic, and the goodness of fit is tested by making a comparison with a chi-square value. In this example, because of $\chi^2(3-1, 0.05)=5.991476357>5.6$, it is understood that the data is judged to match the inhomogeneous Poisson process.

[Embodiment 2]

The details of this embodiment will be described with reference to the accompanying drawings. In this embodiment, in the case where the Poisson probability of a discrete value extends over plural counting sections, the rates at which the Poisson probability of the discrete value is included in the respective counting sections are obtained, and they are classified into the respective counting sections.

Figure 15:
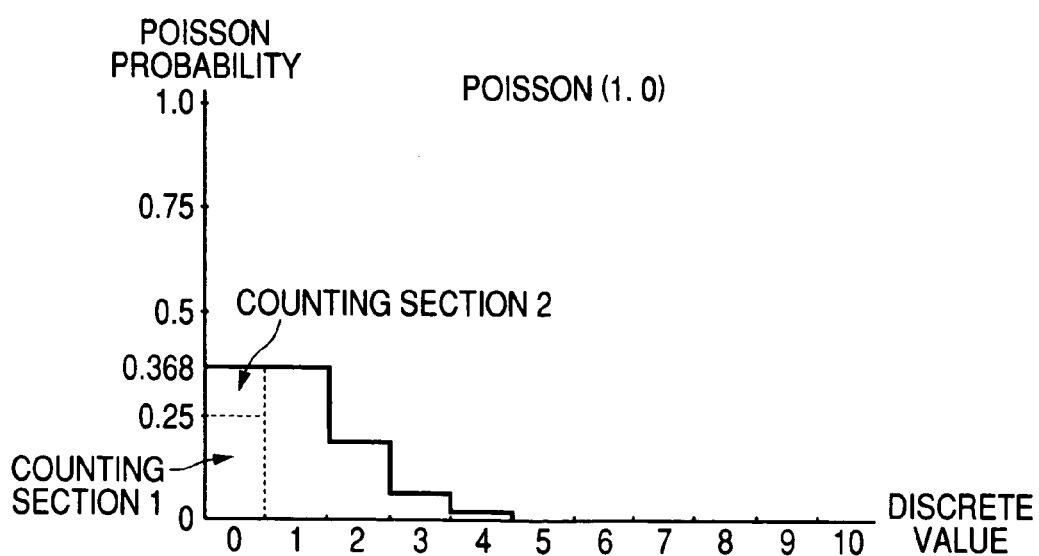
FIG. 15 is a view showing a Poisson distribution with an arrival rate of 1.

For example, as shown in FIG. 15, in the case where the arrival rate is 1, the Poisson probability at which the discrete value becomes 0 is about 0.368. In the case where the division number is made 4, since dividing into quarters is performed, the width of each counting section on the Poisson probability becomes 0.25. In this case, since the Poisson probability of a discrete value of 0 is about 0.368, it is included in the counting section 1 and the counting section 2. Then, the ratios at which the Poisson probability of 0.368 for the discrete value is included in the respective counting sections are obtained. The ratio at which it is included in the counting section 1 is (0.25/0.368), and the ratio at which it is included in the counting section 2 is (0.368−0.25)/0.368.

In this way, in the case where an error becomes large when counting is performed in either one of counting sections, counting can be performed while division into the plural counting sections is performed, so that the error can be made small.

Figure 16:
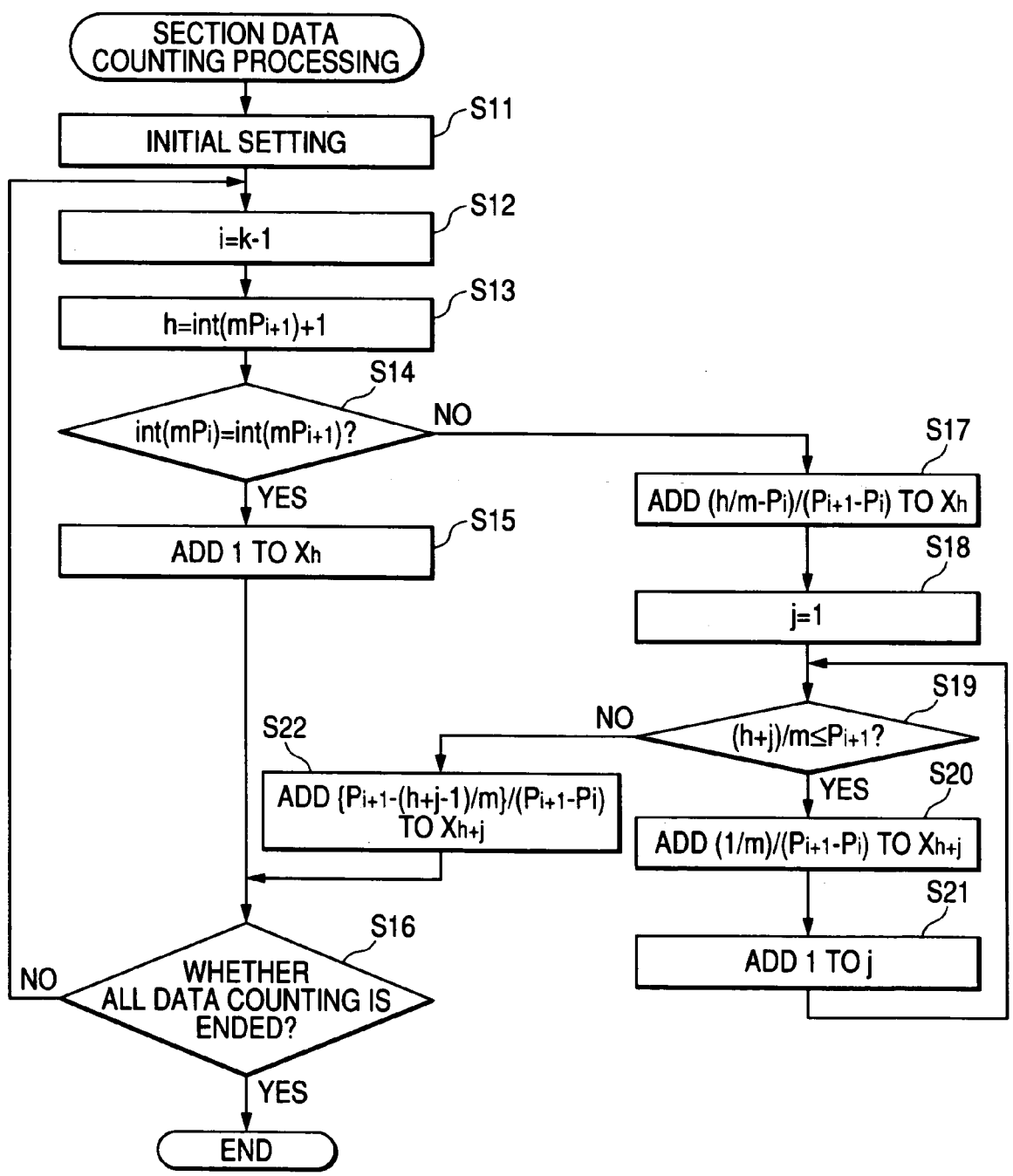
FIG. 16 is a flowchart showing a procedure of a section data counting processing.

A procedure of the division of the Poisson probability of a discrete value will be described with reference to a flowchart shown in FIG. 16. First, initial setting is performed (step S10). A cumulative Poisson probability at which the discrete value becomes k or less is made $P_k$, and $P_0$ is made $P_0=0$. A division number is made m, a storage area for counting is initialized to establish $X_1=X_2=\ldots=X_m=0$. Next, a coefficient i is made k−1 (step S2). The character k denotes a discrete value of data to be counted, and i denotes a value smaller than k by 1.

Next, $h=\text{int}(mP_{i+1})+1$ is calculated. The function int(x) indicates a function to discard digits to the right of the decimal point of x. The character h takes a value of 1 to m, and is a coefficient indicating a counting section. The counting section in which the Poisson probability of the discrete value k is included is obtained by multiplying the cumulative probability at which the discrete value becomes k or less by the division number and by adding 1.

Next, $\text{int}(mP_i)$ is compared with $\text{int}(mP_{i+1})$, and it is judged whether or not these are equal (step S14). When the counting section is not changed even if the discrete value is increased by 1 (step S14/YES), the whole Poisson probability of the discrete value k is included in the counting section of h. At this time, since the whole Poisson probability of the discrete value k is included in one counting section, Xh is set to 1 (step S15).

In the case where $\text{int}(mP_i)$ is not equal to $\text{int}(mP_{i+1})$ (step S14/NO), the Poisson probability of the discrete value k extends over plural counting sections. In this case, the rates at which the Poisson probability of the discrete value k is included in the respective counting sections are obtained, and they must be classified into the respective counting sections.

First, the rate at which the Poisson probability of the discrete value k is included in the counting section h is obtained. This value becomes $(h/m-P_i)/(P_{i+1}-P_i)$ (step S17). The portion $(h/m-P_i)$ denotes the width of the counting section from the cumulative probability of k−1 to the threshold (h/m) between the respective counting sections, and $P_{i+1}-P_i$ denotes the Poisson probability of the discrete value k. In the example of λ=1 and m=4 shown in FIG. 15, when the discrete value is made k=0, it corresponds to the portion of 0.25/(0.368−0).

Next, a variable j (j is an integer not smaller than 1) with an initial value of 1 is used (step S18), an integer value of 1 or more is added to the counting section h, and it is judged whether or not the Poisson probability of the discrete value k extends over two or more counting sections. That is, it is judged whether or not the threshold of a next counting section is smaller than the cumulative Poisson probability of k (step S19). A judgment expression is $(h+j)/m \leq P_{i+1}$.

An integer of 1 or more is added to the counting section h, and when the threshold of the next counting section is smaller than the cumulative Poisson probability of k (step S19/YES) since it extends across the next threshold, the width from the threshold to the threshold is divided by the width of the Poisson probability of the discrete value k, and the rate is obtained. This rate becomes $(1/m)(P_{i+1}-P_i)$ (step S20). The value j is added with 1 (step S21), and this processing is repeated until the threshold becomes larger than the cumulative Poisson probability of k.

Besides, an integer of 1 or more is added to the counting section h, and when the threshold of a next counting section is larger than the cumulative Poisson probability of k (step S19/NO), the width from the threshold across which it finally extends to the cumulative Poisson probability of k is obtained, the width is divided by a difference (width) of the cumulative Poisson probability of from k−1 to k, and the rate is obtained. This rate becomes $$\{P_{i+1}-(h+j-1)\}/m/(P_{i+1}-P_i)$$

(step S22). This is performed for all observed data, and when counting of all the data is ended (step S16/YES), the processing is ended.

SPECIFIC EXAMPLE 4

Next, a description will be given to an example in which division into plural counting sections is made and counting is performed according to the foregoing section data counting processing. Table 9 shows data indicating the relation between the degree of use of the printer and the number of attended person listed in example 3, and Table 10 indicates counting values in respective divided counting sections.

TABLE 9

| | number of output | number of attended persons | expected value | cumulative probability (k − 1) | cumulative probability (k) | classification 1 | classification 2 | classification 3 |
|---|---|---|---|---|---|---|---|---|
| 1 | 11 | 80 | 7.282154122 | 0.880168316 | 0.932809438 | 0 | 0 | 1 |
| 2 | 4 | 50 | 4.531971326 | 0.333603553 | 0.522268318 | 0 | 1 | 0 |
| 3 | 0 | 30 | 2.731182796 | 0 | 0.065142194 | 1 | 0 | 0 |
| 4 | 3 | 25 | 2.275985663 | 0.60241681 | 0.804211299 | 0 | 0.318392523 | 0.681607477 |
| 5 | 2 | 30 | 2.731182796 | 0.243057434 | 0.486016955 | 0.371567633 | 0.628432347 | 0 |
| 6 | 2 | 35 | 3.186379928 | 0.172986184 | 0.382753538 | 0.76440469 | 0.23559531 | 0 |
| 7 | 3 | 40 | 3.641577061 | 0.295453325 | 0.506413382 | 0.179560487 | 0.820439513 | 0 |
| 8 | 5 | 60 | 5.462365591 | 0.363412164 | 0.535380044 | 0 | 1 | 0 |
| 9 | 6 | 80 | 7.283454122 | 0.266014393 | 0.408427795 | 0.473700881 | 0.527299119 | 0 |
| 10 | 1 | 35 | 3.186379928 | 0.041321186 | 0.172986184 | 1 | 0 | 0 |
| 11 | 6 | 80 | 7.283154122 | 0.266014393 | 0.408427795 | 0.472700881 | 0.527299119 | 0 |
| 12 | 7 | 50 | 4.551971326 | 0.824334889 | 0.909071299 | 0 | 0 | 1 |
| 13 | 2 | 30 | 2.731182796 | 0.243057434 | 0.486016955 | 0.371567653 | 0.628432347 | 0 |
| 14 | 1 | 25 | 2.275985663 | 0.102695635 | 0.336429429 | 0.986753754 | 0.013246246 | 0 |
| 15 | 4 | 30 | 2.731182796 | 0.70720591 | 0.858232777 | 0 | 0 | 1 |
| 16 | 2 | 35 | 3.186379928 | 0.172986184 | 0.382753538 | 0.76440469 | 0.23559531 | 0 |
| 17 | 1 | 40 | 3.641577061 | 0.026210975 | 0.121660261 | 1 | 0 | 0 |
| 18 | 7 | 60 | 5.462365591 | 0.691938616 | 0.81410721 | 0 | 0 | 1 |

TABLE 9-continued

|    | number of output | number of attended persons | expected value | cumulative probability (k − 1) | cumulative probability (k) | classification 1 | classification 2 | classification 3 |
|----|------|-----|-------------|-------------|-------------|------------|------------|------------|
| 19 | 13   | 80  | 7.283154122 | 0.964758888 | 0.982658331 | 0          | 0          | 1          |
| 20 | 3    | 35  | 3.186379928 | 0.382753538 | 0.605553033 | 0          | 1          | 0          |
| 21 | 9    | 80  | 7.283154122 | 0.69149876  | 0.800662605 | 0          | 0          | 1          |
| 22 | 3    | 50  | 4.551971326 | 0.167816247 | 0.333603533 | 0.998370085 | 0.001629915 | 0        |
| 23 | 3    | 30  | 2.731182796 | 0.486016955 | 0.70720591  | 0          | 0.816721211 | 0.183278789 |
| 24 | 3    | 25  | 2.275985663 | 0.60241681  | 0.804211299 | 0          | 0318392523  | 0.681607477 |
| 25 | 1    | 30  | 2.731182796 | 0.065142194 | 0.243057434 | 1          | 0          | 0          |
| 26 | 3    | 35  | 3.186379928 | 0.382753538 | 0.605553033 | 0          | 1          | 0          |
| 27 | 4    | 40  | 3.641577061 | 0.506413382 | 0.6984703   | 0          | 0.834405169 | 0.165594831 |
| 28 | 6    | 60  | 5.462365591 | 0.535380044 | 0.691938616 | 0          | 0.83857831  | 0.16142169 |
| 29 | 10   | 80  | 7.283154122 | 0.800662605 | 0.880168316 | 0          | 0          | 1          |
| 30 | 2    | 35  | 3.186379928 | 0.172986184 | 0.382753538 | 0.76440469 | 0.23559531 | 0          |

TABLE 10

| classification | observed frequency | expected frequency | $(X_i - n/m)^2 \div (n/m)$ |
|---|---|---|---|
| 1 | 10.14643546 | 10 | 0.002144334 |
| 2 | 10.98005427 | 10 | 0.096050638 |
| 3 | 8.873510264 | 10 | 0.126897913 |
| total | 30 | 30 | 0.225092885 |

The classification 1, the classification 2 and the classification 3 shown in Table 9 indicate numerical values counted according to the rates at which the Poisson probability of the discrete value is included in the respective counting sections 1, 2 and 3. As a result, as shown in Table 10, because of $\chi^2(3-1, 0.05)=5.991476357>0.225092885$, it is possible to judge that the data well matches the inhomogeneous Poisson process.

SPECIFIC EXAMPLE 5

As a specific example 5, a description will be given to an example in which it is tested whether or not the degree of use of a smoking room of a main office matches the inhomogeneous Poisson process. Also with respect to the degree of use of the smoking room of the main office of a certain company, it is conceivable that as the number of persons becomes large, the number of users increase. Thus, a test is performed on the assumption that the average number of users per time varies in proportion to the number of persons staying in their room. However, in the case of the smoking room, since it is conceivable that nonsmokers do not use, an expected number of persons is obtained by multiplying the number of persons staying in the room by a smoker rate. Here, an average expected number of persons and the number of users for each working time on a weekday are known, and it is tested whether the use rate matches the inhomogeneous Poisson process in proportion to the expected number of persons.

Table 11 shows the number of users on each day, the expected number of persons, an expected value, a cumulative Poisson probability up to a discrete value k−1, a cumulative Poisson probability up to a discrete number k, and rates at which the cumulative Poisson probability of the discrete number k is included in counting sections 1, 2 and 3. Table 12 is a table in which data are re-edited in the counting sections 1, 2 and 3.

TABLE 11

|    | number of users | expected number of persons | expected value | cumulative probability (k − 1) | cumulative probability (k) | classification 1 | classification 2 | classification 3 |
|----|-----|------|-------------|-------------|-------------|------------|------------|------------|
| 1  | 15  | 20   | 13.69509044 | 0.602717891 | 0.699160922 | 0          | 0.663073758 | 0.336926242 |
| 2  | 11  | 16   | 10.95607235 | 0.465146045 | 0.584510607 | 0          | 1          | 0          |
| 3  | 1   | 8    | 5.478036176 | 0.004177526 | 0.027062162 | 1          | 0          | 0          |
| 4  | 0   | 1.2  | 0.821705426 | 0           | 0.439681171 | 0.758125104 | 0.241874896 | 0       |
| 5  | 3   | 3.2  | 2.19121447  | 0.625070462 | 0.821077226 | 0          | 0.212218209 | 0.787781791 |
| 6  | 5   | 6.8  | 4.656330749 | 0.502710181 | 0.676018381 | 0          | 0.946039979 | 0.053960021 |
| 7  | 7   | 10   | 6.84954522  | 0.47266535  | 0.621417318 | 0          | 1          | 0          |
| 8  | 19  | 15.2 | 10.40826873 | 0.989407738 | 0.994714665 | 0          | 0          | 1          |
| 9  | 14  | 18   | 12.3255814  | 0.646748473 | 0.741800955 | 0          | 0.20954943 | 0.79045057 |
| 10 | 8   | 4.8  | 3.286821705 | 0.980630892 | 0.993256145 | 0          | 0          | 1          |
| 11 | 19  | 20   | 13.69509044 | 0.896809564 | 0.935279614 | 0          | 0          | 1          |
| 12 | 11  | 16   | 10.95607235 | 0.465146045 | 0.584510607 | 0          | 1          | 0          |
| 13 | 6   | 8    | 5.47036176  | 0.532687012 | 0.689483379 | 0          | 0.854481882 | 0.145518118 |
| 14 | 1   | 12   | 0.821705426 | 0.439681171 | 0.800969575 | 0          | 0.628266762 | 0.371733238 |
| 15 | 1   | 3.2  | 2.19121447  | 0.111780912 | 0.356716862 | 0.904532066 | 0.095467934 | 0       |
| 16 | 2   | 6.8  | 4.656330749 | 0.053742275 | 0.156742672 | 1          | 0          | 0          |
| 17 | 7   | 10   | 5.94754522  | 0.47266535  | 0.621417618 | 0          | 1          | 0          |
| 18 | 12  | 15.2 | 10.40826873 | 0.64982321  | 0.751370932 | 0          | 0.168324399 | 0.831675601 |
| 19 | 9   | 18   | 12.3255814  | 0.134830501 | 0.21510391  | 1          | 0          | 0          |
| 20 | 1   | 4.8  | 3.286821705 | 0.037372441 | 0.160208993 | 1          | 0          | 0          |

TABLE 11-continued

| number of users | expected number of persons | expected value | cumulative probability (k − 1) | cumulative probability (k) | classification 1 | classification 2 | classification 3 |
|---|---|---|---|---|---|---|---|
| 21 | 10 | 20 | 13.69509044 | 0.024639118 | 0.196780392 | 1 | 0 | 0 |
| 22 | 10 | 16 | 10.95607235 | 0.345296886 | 0.465143045 | 0 | 1 | 0 |
| 23 | 5 | 8 | 5.478036176 | 0.360950613 | 0.532687012 | 0 | 1 | 0 |
| 24 | 0 | 1.2 | 0.821705426 | 0 | 0.139681171 | 0.758125104 | 0.241874896 | 0 |
| 25 | 3 | 3.2 | 2.19121447 | 0.625070462 | 0.821077226 | 0 | 0.212218209 | 0.787781791 |
| 26 | 3 | 6.8 | 4.656330749 | 0.156742672 | 0.316610643 | 1 | 0 | 0 |
| 27 | 7 | 10 | 6.8754522 | 0.47266535 | 0.621417318 | 0 | 1 | 0 |
| 28 | 13 | 15.2 | 10.40826873 | 0.751370932 | 0.832913991 | 0 | 0 | 1 |
| 29 | 7 | 18 | 12.3255814 | 0.038171486 | 0.076215766 | 1 | 0 | 0 |
| 30 | 2 | 4.8 | 3.286821705 | 0.160203993 | 0.362079916 | 0.857599193 | 0.142400807 | 0 |

TABLE 12

| classification | observed frequency | expected frequency | $(X_i - n/m)^2 \div (n/m)$ |
|---|---|---|---|
| 1 | 10.27838147 | 10 | 0.00775 |
| 2 | 11.61579116 | 10 | 0.261078 |
| 3 | 8.105827372 | 10 | 0.358789 |
| total | 30 | 30 | 0.627617 |

The expected value indicates the expected value of users calculated from the expected number of persons in the case where the use rate (arrival rate) is proportional to the expected number of persons. The calculation method is (total number of users)÷(total expected number of persons)× (expected number of persons at that time point). The classification 1, the classification 2 and the classification 3 respectively indicate numerical values counted in the respective counting sections 1, 2 and 3.

As a result, because of $\chi^2(3-1, 0.05)=5.991476357>0.627617$, it is understood that the degree of use well matches the inhomogeneous Poisson process.

SPECIFIC EXAMPLE 6

As a specific example 6, a description will be given to an example in which it is tested whether the degree of use of a smoking room of a business establishment matches the inhomogeneous Poisson process. Also with respect to the degree of use of the smoking room of another business establishment of a certain company, it is conceivable that as the number of persons becomes large, the number of users increases. Thus, a test is performed on the assumption that the average number of users per time varies in proportion to the number persons staying in their room.

Table 13 shows the number of users on each day, the expected number of persons, an expected value, a cumulative Poisson probability up to a discrete value k−1, a cumulative Poisson probability up to a discrete value k, and rates at which the cumulative Poisson probability of the discrete value k is included in counting sections 1, 2 and 3. Table 14 is a table in which data are re-edited in classifications 1, 2 and 3.

TABLE 13

| | number of users | expected number of persons | expected value | cumulative probability (k − 1) | cumulative probability (k) | classification 1 | classification 2 | classification 3 |
|---|---|---|---|---|---|---|---|---|
| 1 | 1 | 11 | 2.052386078 | 0.128428098 | 0.392012139 | 0.777381037 | 0.22618963 | 0 |
| 2 | 4 | 10 | 1.865805526 | 0.880490415 | 0.958643335 | 0 | 0 | 1 |
| 3 | 1 | 8 | 1.492644421 | 0.224777463 | 0.560290288 | 0.323552074 | 0.676447926 | 0 |
| 4 | 2 | 7.5 | 1.399354144 | 0.592055707 | 0.833653797 | 0 | 0.30882264 | 0.69117736 |
| 5 | 1 | 6.5 | 1.585934697 | 0.204756319 | 0.529486469 | 0.395950344 | 0.604049658 | 0 |
| 6 | 0 | 9.5 | 1.775515249 | 0 | 0.169905097 | 1 | 0 | 0 |
| 7 | 3 | 10.5 | 1.959095802 | 0.687746419 | 0.864428 | 0 | 0 | 1 |
| 8 | 3 | 10.8 | 2.015069968 | 0.672597496 | 0.854393936 | 0 | 0 | 1 |
| 9 | 0 | 11.1 | 2.071044133 | 0 | 0.126054036 | 1 | 0 | 0 |
| 10 | 1 | 6 | 1.119483315 | 0.326448422 | 0.691901984 | 0.481763806 | 0.481763806 | 0.036472387 |
| 11 | 2 | 11 | 2.052386078 | 0.392012139 | 0.662500247 | 0 | 1 | 0 |
| 12 | 4 | 10 | 1.865805526 | 0.880490415 | 0.958643335 | 0 | 0 | 1 |
| 13 | 0 | 8 | 1.492644421 | 0 | 0.224777463 | 1 | 0 | 0 |
| 14 | 1 | 7.5 | 1.399354144 | 0.246756281 | 0.592055707 | 0.250730368 | 0.749269632 | 0 |
| 15 | 4 | 8.5 | 1.585934697 | 0.923113151 | 0.977084997 | 0 | 0 | 1 |
| 16 | 1 | 9.5 | 1.772515249 | 0.169908097 | 0.471064473 | 0.542663617 | 0.457336838 | 0 |
| 17 | 2 | 10.5 | 1.959095802 | 0.417190614 | 0.687746419 | 0 | 0.922087229 | 0.077912771 |
| 18 | 3 | 10.8 | 2.015069968 | 0.672597496 | 0.854393936 | 0 | 0 | 1 |
| 19 | 1 | 11.1 | 2.071044133 | 0.126054096 | 0.387117691 | 0.793979863 | 0.206020137 | 0 |

TABLE 13-continued

| number of users | expected number of persons | expected value | cumulative probability (k − 1) | cumulative probability (k) | classification 1 | classification 2 | classification 3 |
|---|---|---|---|---|---|---|---|
| 20 | 2 | 6 | 1.119483315 | 0.691901984 | 0.896461566 | 0 | 0 | 1 |
| 21 | 2 | 11 | 2.052386078 | 0.392012139 | 0.662500247 | 0 | 1 | 0 |
| 22 | 3 | 10 | 1.865808826 | 0.712942576 | 0.830490415 | 0 | 0 | 1 |
| 23 | 2 | 8 | 1.492644421 | 0.560290288 | 0.810890962 | 0 | 0.424824649 | 0.575175351 |
| 24 | 1 | 7.5 | 1.399354144 | 0.246756281 | 0.592055707 | 0.250730368 | 0.749269632 | 0 |
| 25 | 2 | 8.5 | 1.585934697 | 0.529486469 | 0.786986875 | 0 | 0.532737793 | 0.467262207 |
| 26 | 2 | 9.5 | 1.772515249 | 0.471064473 | 0.737969266 | 0 | 0.732853807 | 0.267146193 |
| 27 | 1 | 10.5 | 1.959095802 | 0.140985842 | 0.417190614 | 0.696394525 | 0.303605475 | 0 |
| 28 | 1 | 10.8 | 2.015069963 | 0.133311076 | 0.40194222 | 0.744598166 | 0.255401834 | 0 |
| 29 | 1 | 11.1 | 2.071044133 | 0.126054096 | 0.387117691 | 0.793979863 | 0.206020137 | 0 |
| 30 | 1 | 6 | 1.119483315 | 0.326443422 | 0.691901984 | 0.481763306 | 0.481783806 | 0.036472387 |

TABLE 14

| classification | observed frequency | expected frequency | $(X_i - n/m)^2 \div (n/m)$ |
|---|---|---|---|
| 1 | 9.533487838 | 10 | 0.021763 |
| 2 | 10.31489351 | 10 | 0.009916 |
| 3 | 10.15161866 | 10 | 0.002299 |
| total | 30 | 30 | 0.033977973 |

Similarly to the former example, in the case of the smoking room, since it is conceivable that nonsmokers do not use, the expected number of persons is obtained by multiplying the number of persons staying in their room by a smoker rate. Here, the average expected number of persons for each working time on a weekday and the number of users are known, and it is tested whether the use rate matches the inhomogeneous Poisson process in proportion to the expected number of persons.

In the case where it is assumed that the use rate (arrival rate) is in proportion to the expected number of persons, the expected value indicates the expected value of the users calculated from the expected number of persons. The calculation method is (total number of users)÷(total expected number of persons)×(expected number of persons at that time point).

The classification 1, the classification 2 and the classification 3 indicate numerical values counted in the respective counting sections.

As a result, because of $\chi^2(3-1, 0.05)=5.991476357>0.033977973$, it is understood that the use rate well matches the inhomogeneous Poisson process.

SPECIFIC EXAMPLE 7

As a specific example 7, a description will be given to an example in which the observed data of specific example 5 and specific example 6 are combined, and it is tested whether the degrees of use of the smoking rooms of the main office and the business establishment can be said to match the same inhomogeneous Poisson process. On the assumption that the average number of users per time similarly varies in proportion to the number of persons staying in their room, the description will be given to the example in which it is tested whether the use degrees of the smoking rooms of the main office of a certain company and another business establishment follow the same distribution. The number of users and the expected number of persons are the data of the two former examples.

Table 15 shows the number of users of the main office on each day, the expected number of persons, an expected value, a cumulative Poisson probability up to a discrete value k−1, a cumulative Poisson probability up to a discrete value k, and rates at which the cumulative Poisson probability of the discrete value k is included in counting sections 1, 2 and 3. Table 16 shows the number of users of the business establishment on each day, the expected number of persons, the expected value, a cumulative Poisson probability up to a discrete value k−1, a cumulative Poisson probability up to a discrete value k, and rates at which the cumulative Poisson probability of the discrete value k is included in counting sections 1, 2 and 3. Table 17 is a table in which the data of the main office and the data of the business establishment are re-edited in the counting sections 1, 2 and 3.

TABLE 15

| | number of users | expected number of persons | expected value | cumulative probability (k − 1) | cumulative probability (k) | classification 1 | classification 2 | classification 3 |
|---|---|---|---|---|---|---|---|---|
| 1 | 15 | 20 | 8.975012749 | 0.959337268 | 0.978445829 | 0 | 0 | 1 |
| 2 | 11 | 16 | 7.180010199 | 0.888210407 | 0.93809669 | 0 | 0 | 1 |
| 3 | 1 | 8 | 3.590005099 | 0.02759819 | 0.126675831 | 1 | 0 | 0 |
| 4 | 0 | 1.2 | 0.538500765 | 0 | 0.583622584 | 0.571145364 | 0.428854646 | 0 |
| 5 | 3 | 3.2 | 1.43600204 | 0.824731752 | 0.942131227 | 0 | 0 | 1 |
| 6 | 5 | 6.8 | 3.051504335 | 0.806535893 | 0.910800573 | 0 | 0 | 1 |
| 7 | 7 | 10 | 4.487506374 | 0.832647923 | 0.914438968 | 0 | 0 | 1 |
| 8 | 19 | 15.2 | 6.821009689 | 0.999906268 | 0.999968743 | 0 | 0 | 1 |
| 9 | 14 | 18 | 8.077511474 | 0.963467648 | 0.981392647 | 0 | 0 | 1 |

TABLE 15-continued

| | number of users | expected number of persons | expected value | cumulative probability (k − 1) | cumulative probability (k) | classification 1 | classification 2 | classification 3 |
|---|---|---|---|---|---|---|---|---|
| 10 | 8 | 4.8 | 2.15400306 | 0.996262312 | 0.999595767 | 0 | 0 | 1 |
| 11 | 19 | 20 | 8.975012749 | 0.997644993 | 0.998977818 | 0 | 0 | 1 |
| 12 | 11 | 16 | 7.180010199 | 0.888210407 | 0.93809669 | 0 | 0 | 1 |
| 13 | 6 | 8 | 3.590005099 | 0.845491953 | 0.927549493 | 0 | 0 | 1 |
| 14 | 1 | 1.2 | 0.538500765 | 0.583622584 | 0.897903792 | 0 | 0.26423496 | 0.73576504 |
| 15 | 1 | 3.2 | 1.43600204 | 0.237876882 | 0.579468571 | 0.279446058 | 0.720553942 | 0 |
| 16 | 2 | 6.8 | 3.051504335 | 0.19158646 | 0.411750555 | 0.643823751 | 0.356176249 | 0 |
| 17 | 7 | 10 | 4.487506374 | 0.332647923 | 0.914438968 | 0 | 0 | 1 |
| 18 | 12 | 15.2 | 6.821009689 | 0.954326761 | 0.977421878 | 0 | 0 | 1 |
| 19 | 9 | 18 | 8.77511474 | 0.581729131 | 0.706961489 | 0 | 0.678239527 | 0.321760473 |
| 20 | 1 | 4.8 | 2.15400306 | 0.116018797 | 0.36592364 | 0.669589135 | 0.130410865 | 0 |
| 21 | 10 | 20 | 8.975012749 | 0.590700418 | 0.708947163 | 0 | 0.642438392 | 0.357581608 |
| 22 | 10 | 16 | 7.180010159 | 0.811783063 | 0.888210407 | 0 | 0 | 1 |
| 23 | 5 | 8 | 3.590005099 | 0708348627 | 0.845491953 | 0 | 0 | 1 |
| 24 | 0 | 1.2 | 0.538500765 | 0 | 0.583622584 | 0.571145364 | 0.428854636 | 0 |
| 25 | 3 | 3.2 | 1.43600204 | 0.824731752 | 0.942131227 | 0 | 0 | 1 |
| 26 | 3 | 6.8 | 3.051504335 | 0.411750555 | 0.63569445 | 0 | 1 | 0 |
| 27 | 7 | 10 | 4.487506374 | 0.832647923 | 0.914438968 | 0 | 0 | 1 |
| 28 | 13 | 15.2 | 6.821009689 | 0.977421878 | 0.989539725 | 0 | 0 | 1 |
| 29 | 7 | 18 | 8.077511474 | 0.303999173 | 0.442194666 | 0.212265678 | 0.787734322 | 0 |
| 30 | 2 | 4.8 | 2.15400306 | 0.36592364 | 0.635071539 | 0 | 0 | 0 |

TABLE 16

| | number of users | expected number of persons | expected value | cumulative probability (k − 1) | cumulative probability (k) | classification 1 | classification 2 | classification 3 |
|---|---|---|---|---|---|---|---|---|
| 1 | 1 | 11 | 4.936257012 | 0.007181428 | 0.042630803 | 1 | 0 | 0 |
| 2 | 4 | 10 | 4.487506374 | 0.344408241 | 0.534476596 | 0 | 1 | 0 |
| 3 | 1 | 8 | 3.590005099 | 0.02759819 | 0.126675831 | 1 | 0 | 0 |
| 4 | 2 | 7.5 | 3.365629781 | 0.150789972 | 0.346418725 | 0.933120641 | 0.066879359 | 0 |
| 5 | 1 | 8.5 | 3.814380418 | 0.022051373 | 0.106163698 | 1 | 0 | 0 |
| 6 | 0 | 9.5 | 4.263131056 | 0 | 0.014078154 | 1 | 0 | 0 |
| 7 | 3 | 10.5 | 4.711881693 | 0.151110879 | 0.307817614 | 1 | 0 | 0 |
| 8 | 3 | 10.8 | 4.846505884 | 0.138189461 | 0.287236741 | 1 | 0 | 0 |
| 9 | 0 | 11.1 | 4.931132075 | 0 | 0.006866295 | 1 | 0 | 0 |
| 10 | 1 | 6 | 2.692503825 | 0.06771119 | 0.250023828 | 1 | 0 | 0 |
| 11 | 2 | 11 | 4.936257012 | 0.042630803 | 0.130124416 | 1 | 0 | 0 |
| 12 | 4 | 10 | 4.487506374 | 0.344408241 | 0.534476596 | 0 | 1 | 0 |
| 13 | 0 | 8 | 3.590005099 | 0 | 0.02759819 | 1 | 0 | 0 |
| 14 | 1 | 7.5 | 3.365629781 | 0.034540256 | 0.150789972 | 1 | 0 | 0 |
| 15 | 4 | 8.5 | 3.814380418 | 0.47054725 | 0.685047609 | 0 | 1 | 0 |
| 16 | 1 | 9.5 | 4.263131056 | 0.014078154 | 0.074095169 | 1 | 0 | 0 |
| 17 | 2 | 10.5 | 4.711881893 | 0.051337332 | 0.151110879 | 1 | 0 | 0 |
| 18 | 3 | 10.8 | 4.846506384 | 0.138169461 | 0.287236741 | 1 | 0 | 0 |
| 19 | 1 | 11.1 | 4.981132075 | 0.006866285 | 0.041068157 | 1 | 0 | 0 |
| 20 | 2 | 6 | 2.692503825 | 0.250023828 | 0.495462566 | 0.339430956 | 0.660569044 | 0 |
| 21 | 2 | 11 | 4.936257012 | 0.042630803 | 0.130124416 | 1 | 0 | 0 |
| 22 | 3 | 10 | 4.487506374 | 0.174988221 | 0.344408241 | 0.934630466 | 0.065369534 | 0 |
| 23 | 1 | 8 | 3.590005099 | 0.126675831 | 0.304520451 | 1 | 0 | 0 |
| 24 | 1 | 7.5 | 3.365629791 | 0.034540256 | 0.150789972 | 1 | 0 | 0 |
| 25 | 2 | 8.5 | 3.814380418 | 0.106163698 | 0.2665819 | 1 | 0 | 0 |
| 26 | 2 | 9.5 | 4.263131056 | 0.074095169 | 0.202025369 | 1 | 0 | 0 |
| 27 | 1 | 10.5 | 4.711881693 | 0.008987849 | 0.057337532 | 1 | 0 | 0 |
| 28 | 1 | 10.8 | 4.846506884 | 0.007855771 | 0.045928818 | 1 | 0 | 0 |
| 29 | 1 | 11.1 | 4.981132075 | 0.006866285 | 0.041068157 | 1 | 0 | 0 |
| 30 | 1 | 6 | 2.692503825 | 0.06771119 | 0.250023828 | 1 | 0 | 0 |

TABLE 17

| classification | observed frequency | expected frequency | $(Xi - n/m)^2 \div (n/m)$ |
|---|---|---|---|
| 1 | 30.35459741 | 20 | 5.360884 |
| 2 | 10.23031547 | 20 | 4.772337 |
| 3 | 19.41508712 | 20 | 0.017106 |
| total | 60 | 60 | 10.15032733 |

Here, the expected value indicates the expected value of users calculated by adding the data of the main office and the data of the business establishment and from the expected number of persons. The calculation method is the combination of the data of both the main office and the business establishment and (total number of users)÷(total expected number of persons)×(expected number of persons at that time point).

As is apparent from Table 15 and Table 16, since the average use rate per the number of persons is different from the case of only the main office and the case of only the business establishment, a calculated value after the expected value is different. As a result, because of $\chi^2(3-1, 0.05)$ $=5.991476357<10.15032733$, it is understood that the use rate does not match the inhomogeneous Poisson process in proportion to the expected number of persons.

In the two former examples, in each of the bases, since it can be said that the use rate matches the inhomogeneous Poisson process in proportion to the expected number of persons, it is possible to draw a conclusion that the use rate per the expected number of persons is largely different between the main office and the business establishment. In this way, it also becomes possible to perform the comparison of varying distributions.

SPECIFIC EXAMPLE 8

As a specific example 8, a description will be given to an example in which a comparison is made between a past use rate of a parking lot and a present use rate.

TABLE 18

|  | 9:00 | 10:00 | 11:00 | 12:00 | 13:00 | 14:00 | 15:00 | 16:00 | 17:00 | 18:00 |
|---|---|---|---|---|---|---|---|---|---|---|
| first day | 2 | 6 | 2 | 11 | 6 | 13 | 7 | 13 | 1 | 2 |
| second day | 1 | 2 | 5 | 3 | 10 | 16 | 17 | 15 | 0 | 0 |
| third day | 1 | 2 | 3 | 8 | 6 | 15 | 12 | 14 | 0 | 1 |
| past average | 4 | 6 | 10 | 6 | 12 | 10 | 6 | 5 | 4 | 2 |

TABLE 19

| arrival number | past average | classification 1 | classification 2 | classification 3 |
|---|---|---|---|---|
| 1 | 2 | 4 | 1 | 0 | 0 |
| 2 | 6 | 6 | 0 | 1 | 0 |
| 3 | 2 | 10 | 1 | 0 | 0 |
| 4 | 11 | 6 | 0 | 0 | 1 |
| 5 | 6 | 12 | 1 | 0 | 0 |
| 6 | 13 | 10 | 0 | 0 | 1 |
| 7 | 7 | 6 | 0 | 0.404656279 | 0.595343721 |
| 8 | 13 | 5 | 0 | 0 | 1 |
| 9 | 1 | 4 | 1 | 0 | 0 |
| 10 | 2 | 2 | 0 | 0.952761133 | 0.047238867 |
| 11 | 1 | 4 | 1 | 0 | 0 |
| 12 | 2 | 6 | 1 | 0 | 0 |
| 13 | 5 | 10 | 1 | 0 | 0 |
| 14 | 3 | 6 | 1 | 0 | 0 |
| 15 | 10 | 12 | 0.807556779 | 0.192443221 | 0 |
| 16 | 16 | 10 | 0 | 0 | 1 |
| 17 | 17 | 6 | 0 | 0 | 1 |
| 18 | 15 | 5 | 0 | 0 | 1 |
| 19 | 0 | 4 | 1 | 0 | 0 |
| 20 | 0 | 2 | 1 | 0 | 0 |
| 21 | 1 | 4 | 1 | 0 | 0 |
| 22 | 2 | 6 | 1 | 0 | 0 |
| 23 | 3 | 10 | 1 | 0 | 0 |
| 24 | 8 | 6 | 0 | 0 | 1 |
| 25 | 6 | 12 | 1 | 0 | 0 |

TABLE 19-continued

| arrival number | past average | classification 1 | classification 2 | classification 3 |
|---|---|---|---|---|
| 26 | 15 | 10 | 0 | 0 | 1 |
| 27 | 12 | 6 | 0 | 0 | 1 |
| 28 | 14 | 5 | 0 | 0 | 1 |
| 29 | 0 | 4 | 1 | 0 | 0 |
| 30 | 1 | 2 | 0.722648929 | 0.277351071 | 0 |

TABLE 20

| classification | observed frequency | expected frequency | $(X_i - n/m)^2 \div (n/m)$ |
|---|---|---|---|
| 1 | 16.53020571 | 10 | 4.264359 |
| 2 | 2.827211704 | 10 | 5.144889 |
| 3 | 10.64258259 | 10 | 0.041291 |
| total | 30 | 30 | 9.450539092 |

Table 18 shows the comparison between the past average arrival rate of the pay-by-the-hour parking lot and the present arrival number of cars while the arrival of cars follows the inhomogeneous Poisson process. The way of obtaining counting sections is based on division in probability according to the assumed distribution parameter (past average) similarly to the other examples, and a midway calculation result is partially omitted and is shown in Table 19.

As the result, as shown in Table 20, because of $\chi^2(3-1, 0.05)=5.991476357<9.450539092$, it can be said that the use rate does not match the inhomogeneous Poisson process indicated by the past average. From this, it is understood that in terms of the arrival number of the parking lot for the last several days, the tendency of use is different from the past average in the tendency.

SPECIFIC EXAMPLE 9

As a specific example 9, a description will be given to an example in which it is tested whether the use degree of a printer matches a binomial distribution.

TABLE 21

| number of outputs | number of attended persons | cumulative probability (k − 1) | cumulative probability (k) | classification 1 | classification 2 | classification 3 |
|---|---|---|---|---|---|---|
| 1 | 1 | 80 | 0.89057734 | 0.942028815 | 0 | 0 | 1 |
| 2 | 4 | 50 | 0.321303397 | 0.517316049 | 0.061373263 | 0.938626737 | 0 |
| 3 | 0 | 30 | 0 | 0.057062577 | 1 | 0 | 0 |
| 4 | 3 | 25 | 0.599011084 | 0.811534793 | 0 | 0.318343694 | 0.631656306 |
| 5 | 2 | 30 | 0.228520319 | 0.47752618 | 0.420925894 | 0.579074106 | 0 |
| 6 | 2 | 35 | 0.159522364 | 0.370853024 | 0.822459785 | 0.177540215 | 0 |
| 7 | 3 | 40 | 0.281877309 | 0.499955474 | 0.235952208 | 0.764047792 | 0 |
| 8 | 5 | 60 | 0.35237729 | 0.531618549 | 0 | 1 | 0 |
| 9 | 6 | 80 | 0.253240385 | 0.399645161 | 0.547065132 | 0.452934868 | 0 |
| 10 | 1 | 35 | 0.035405979 | 0.159522364 | 1 | 0 | 0 |
| 11 | 6 | 80 | 0.253240385 | 0.399645161 | 0.547065132 | 0.452934868 | 0 |
| 12 | 7 | 50 | 0.833607842 | 0.919024236 | 0 | 0 | 1 |
| 13 | 2 | 30 | 0.228520319 | 0.47752618 | 0.420925894 | 0.579074106 | 0 |
| 14 | 1 | 25 | 0.091965757 | 0.322242789 | 1 | 0 | 0 |
| 15 | 4 | 30 | 0.710298221 | 0.867667173 | 0 | 0 | 1 |
| 16 | 2 | 35 | 0.159522364 | 0.370853024 | 0.822459785 | 0.177540215 | 0 |
| 17 | 1 | 40 | 0.021968572 | 0.109981465 | 1 | 0 | 0 |
| 18 | 7 | 60 | 0.696182192 | 0.823331523 | 0 | 0 | 1 |
| 19 | 13 | 80 | 0.971660076 | 0.987183952 | 0 | 0 | 1 |
| 20 | 3 | 35 | 0.370853024 | 0.603683411 | 0 | 1 | 0 |
| 21 | 9 | 80 | 0.696334231 | 0.80985235 | 0 | 0 | 1 |
| 22 | 3 | 50 | 0.154746827 | 0.321303397 | 1 | 0 | 0 |
| 23 | 3 | 30 | 0.47752618 | 0.710298221 | 0 | 0.812556724 | 0.197443276 |
| 24 | 3 | 25 | 0.599011084 | 0.811534793 | 0 | 0.318343694 | 0.681656306 |
| 25 | 1 | 30 | 0.057062577 | 0.228520319 | 1 | 0 | 0 |
| 26 | 3 | 35 | 0.370853024 | 0.603683411 | 0 | 1 | 0 |
| 27 | 4 | 40 | 0.499955474 | 0.70199595 | 0 | 0.8528137595 | 0.174862405 |
| 28 | 6 | 60 | 0.531618549 | 0.696182192 | 0 | 0.8020643706 | 0.179356294 |
| 29 | 10 | 80 | 0.80985235 | 0.89057734 | 0 | 0 | 1 |
| 30 | 2 | 35 | 0.159522364 | 0.370853024 | 0.822459875 | 0.177540215 | 0 |

TABLE 22

| classification | observed frequency | expected frequency | $(X_i - n/m)^2 \div (n/m)$ |
|---|---|---|---|
| 1 | 10.70068688 | 10 | 0.049096 |
| 2 | 10.39433853 | 10 | 0.01555 |
| 3 | 8.904974587 | 10 | 0.119908 |
| total | 30 | 30 | 0.184554564 |

In the case where the number of attended persons is small, there is a case where it is more suitable to use the binomial distribution in which the probability at which one person prints out in a definite time is P. Here, a description will be given to an example in which the probability P is made (total number of outputs)/(total number of attended persons) =0.091039427, and the goodness of fit to the binomial distribution in which the trial number n is made the number of attended persons is tested. Similarly to the Poisson distribution, the cumulative probability is used, and three classifications in probability are formed.

As a result, because of $\chi^2(3-1, 0.05)$=5.991476357>0.184554564, it is judged that the degree of use well matches the binomial distribution in which the trial number n is made the number of attended persons.

As described above, in this example, since the arrival rate in each time period can be estimated, in view of a parameter of a most crowded time zone, for example, it is possible to propose to the customer the specifications for necessary speed and the like of a printer while the statistic of the number of output sheets is taken into consideration, or in a design department of a printer, the specifications for a memory size and the like necessary for a queue of a printer can be determined while the statistic of the output file size is taken into consideration.

On the contrary, this example is integrated into a printer or the like, a statistic in each time period is counted, and it is possible to test whether for example, the number of outputs on a certain a day is different from a normal use state. When this is monitored on-line, it becomes possible to make such a service such as to advance the supply timing of consumable goods such as paper and toner, or to advance the timing of maintenance. Similarly, even in a probability process varying temporally, such as the number of passengers getting on and off a train and the number of guests coming to a store, an average arrival number in each time zone is obtained and is made an estimated value of an arrival rate, and it becomes possible to test whether the probability process can be treated as a inhomogeneous Poisson process, to diagnose whether data on a certain day is data remote from a steady state, or to make a comparison of arrival degree of customers among plural stores.

[Embodiment 3]

Figure 17:
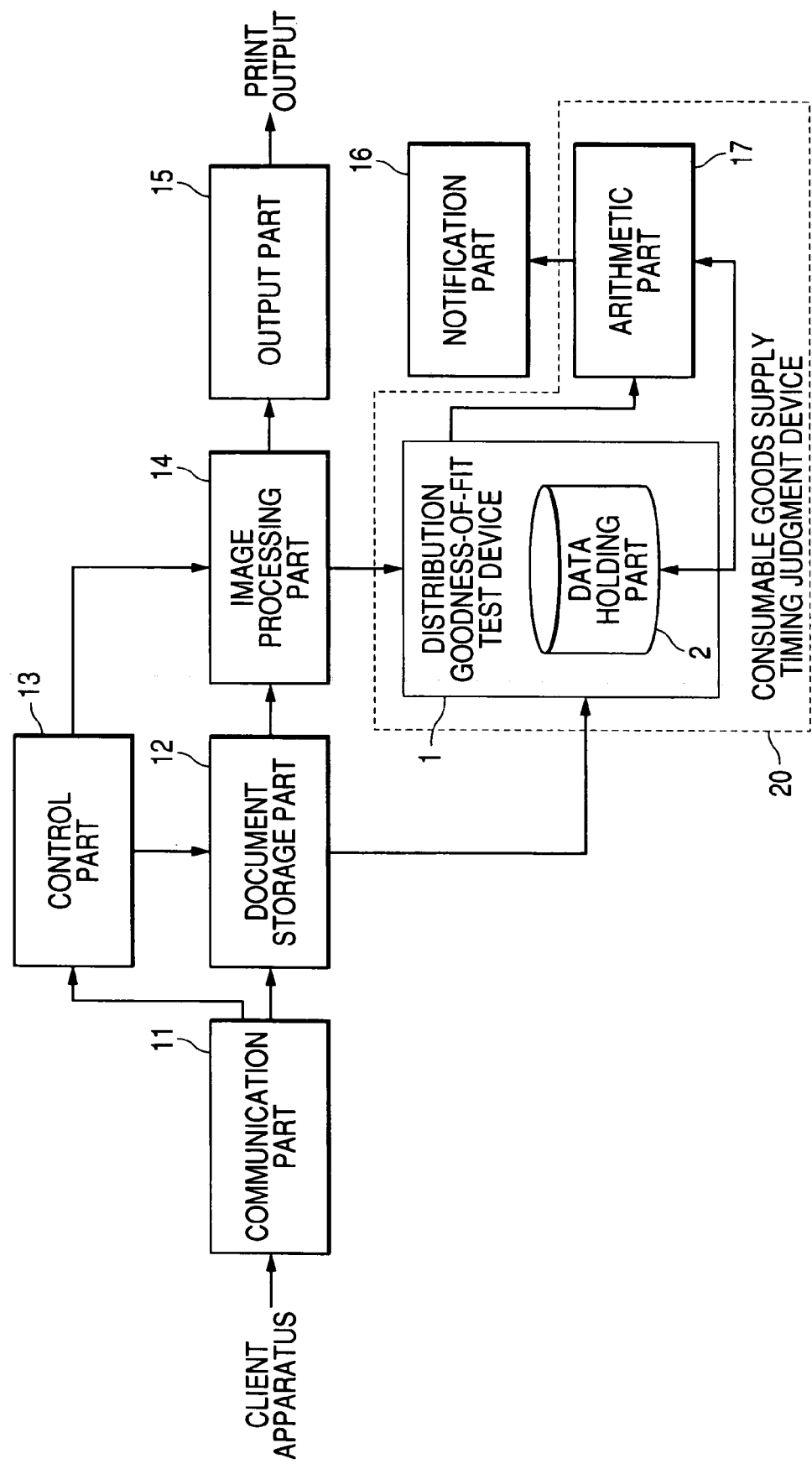
FIG. 17 is a block diagram showing a structure of a printer apparatus 10.

Next, an embodiment in which the foregoing distribution goodness-of-fit test device 1 is provided in a printer apparatus 10 will be described. FIG. 17 shows a structure of the printer device 10. As shown in FIG. 17, the printer apparatus 10 includes a communication part 11, a document storage part 12, a control part 13, an image processing part 14, an output part 15, a notification part 16, and a consumable goods supply timing judgment device 20 including the foregoing distribution goodness-of-fit test device 1 and an arithmetic part 17.

The communication part 11 exchanges data with a PC as a client apparatus directly or through a network. A document received through the communication part 11 is stored in the document storage part 12. The control part 13 receives a print job through the communication part 11, and stores the print job into a print queue so that it can be sequentially printed out. The print queue is a program which stores the print job so that it can be sequentially printed out. The print queue sends the time when the storage of the document is completed to the distribution goodness-of-fit test device 1, waits until the image processing part 14 comes to have a state in which a processing is not being performed, and sends the document data stored in the document storage part 12 to the image processing part 14.

The image processing part 14 color-separates the document data to convert it into a raster image for print output, and sends it to the output part 15. The output part 15 is a functional part for printing on a sheet or the like. The image processing part 14 sends information of the number of pages of the raster image sent to the output part 15 to the distribution goodness-of-fit test device 1.

The consumable goods supply timing judgment device 20 includes the foregoing distribution goodness-of-fit test device 1 and the arithmetic part 17. On the basis of the storage time of the document into the document storage part 12, the arithmetic part 17 obtains an average value in a steady state at constant time intervals between the supply of sheets and next supply and an average value of the number of pages per one time. The distribution estimation part 3 uses these data to estimate an arrival distribution, and stores it in the data holding part 2.

Besides, the arithmetic part 17 compares the obtained statistical data with the time data of the document arrival from the final sheet supply by the test method of the invention, and in the case where the arrival distribution is significantly different from the steady state and is larger than usual, or in the case where the average number of pages is large, that is, in the case where consumption is high, a warning is issued from the notification part 16.

Besides, instead of the notification part 16, the network connection is provided, and when notification is made through the network, a service of delivery can be performed before the sheet runs out, or it is also possible to perform the delivery service of the whole consumable goods by estimating the number of pages in view of the use quantity of ink or toner.

Figure 18:
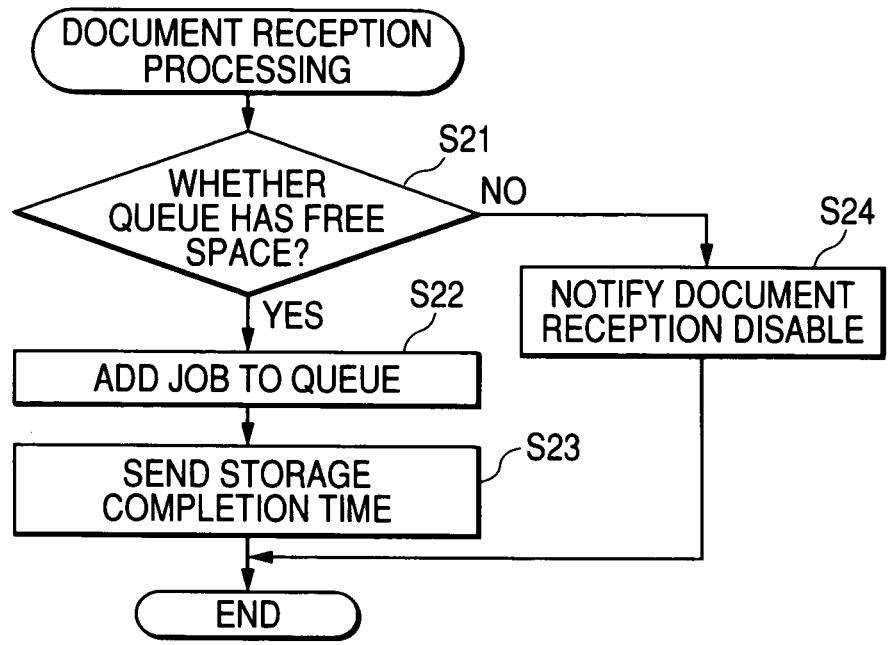
FIG. 18 is flowchart showing a procedure of a document receiving processing.

The detailed procedure of each processing will be described with reference to flowcharts. First, a procedure of a document receiving processing by the control part 13 will be described with reference to a flowchart shown in FIG. 18. When accepting a sending request for a document, the control part 13 examines the free space of the queue (step S21). In the case where the queue does not have the free space (step S21/NO), it is notified through the communication part 11 that it is impossible to receive the document (step S24). When it is possible to receive the document (step S21/YES), a print job is added to the queue (step S22), and the time when the storage is completed is sent to the distribution goodness-of-fit test device 1 (step S23).

Figure 19:
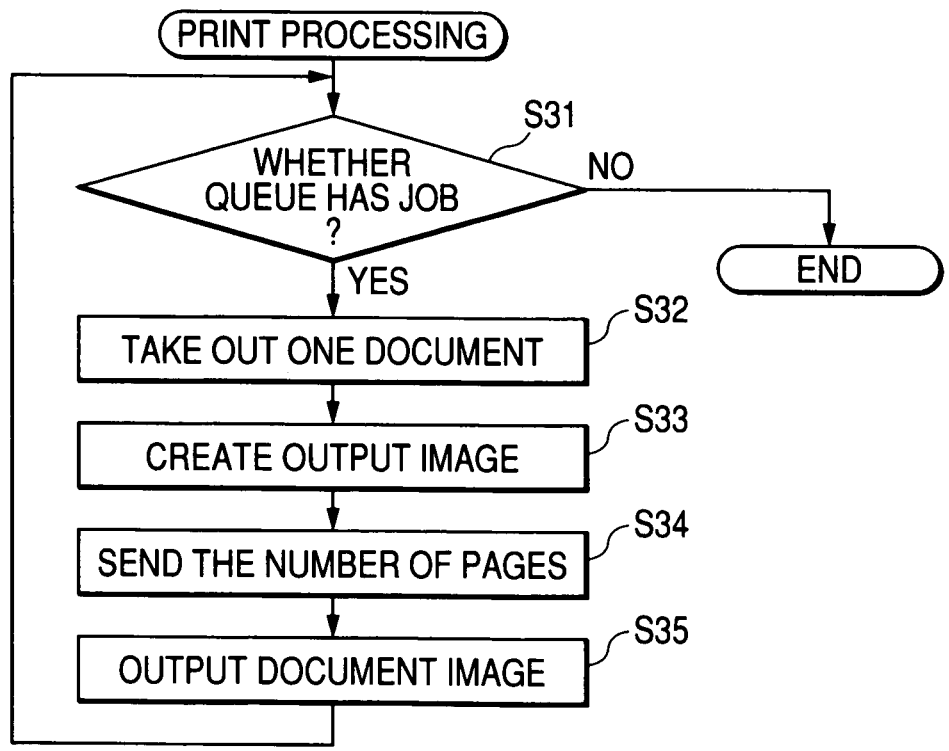
FIG. 19 is a flowchart showing a procedure of a print processing.

Next, a procedure of a print processing by the image processing part 14 will be described with reference to a flowchart shown in FIG. 19.

In the print processing, the image processing part 14 examines whether the document is stored in the document storage part 12 in accordance with the print job stored in the print queue (step S31). When the document exists (step S31/YES), one document is taken out of the print queue (step S32). In general, the document having arrived at the print queue earliest is taken out. Here, according to the information of documents, when the sheet with a certain size is used up, the document with the size is skipped, and a document which can be outputted at that time point may be taken out.

The document taken out is subjected to output image formation by color separation for output and page layout processing (step S33). The information of the number of pages obtained by the formation of the output image is sent to the distribution goodness-of-fittest device 1 (step S34), and then, print out or the like is performed by the output part 15 so that the output image is outputted (step S35). After the document image is outputted, the procedure returns again to the step of examining whether a print job exists in the queue, and when the print job runs out, the processing is ended.

Figure 20:
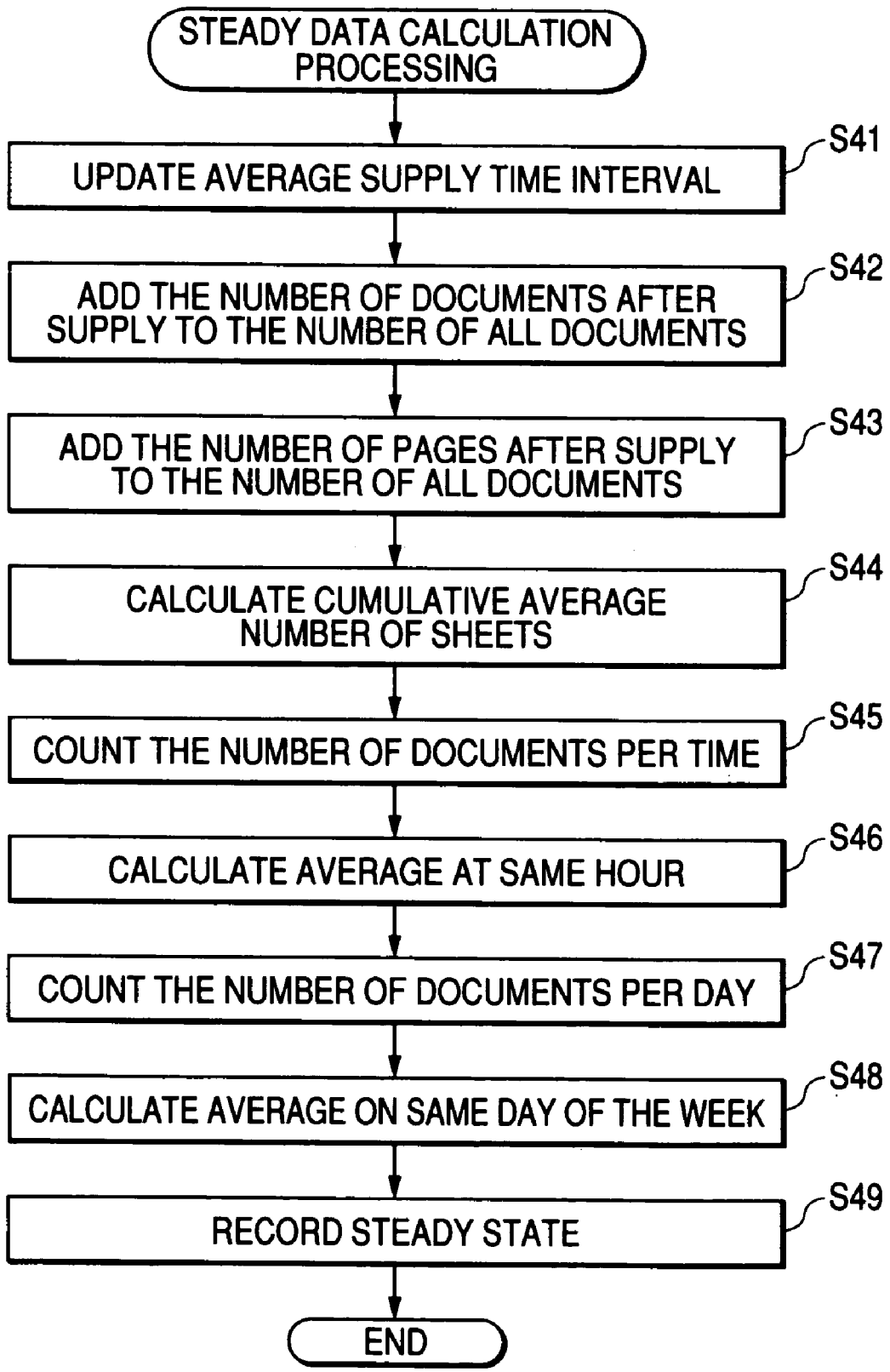
FIG. 20 is a flowchart showing a procedure of a steady data calculation processing.

Next, a calculation procedure of steady data performed by the arithmetic part 17 will be described with reference to a flowchart shown in FIG. 20.

The calculation of the steady data is performed at the supply timing of a sheet in the arithmetic part 17. First, a time from the former supply time is obtained, and the past average supply time interval is updated (step S41). Subsequently, the number of documents from the timing when the sheets are supplied last time and the number of pages of the documents are added to the past cumulative value (steps S42 and 43), and the average number of cumulative documents is calculated (step S44). Further, the storage time of the documents into the document storage part 12 is counted (step S45), an average number of documents in each time and the average number of documents for each day of the week are calculated (steps S46, S47 and S48), and they are recorded as expected frequency data for a test into the data storage part 2 (step S49).

Figure 21:
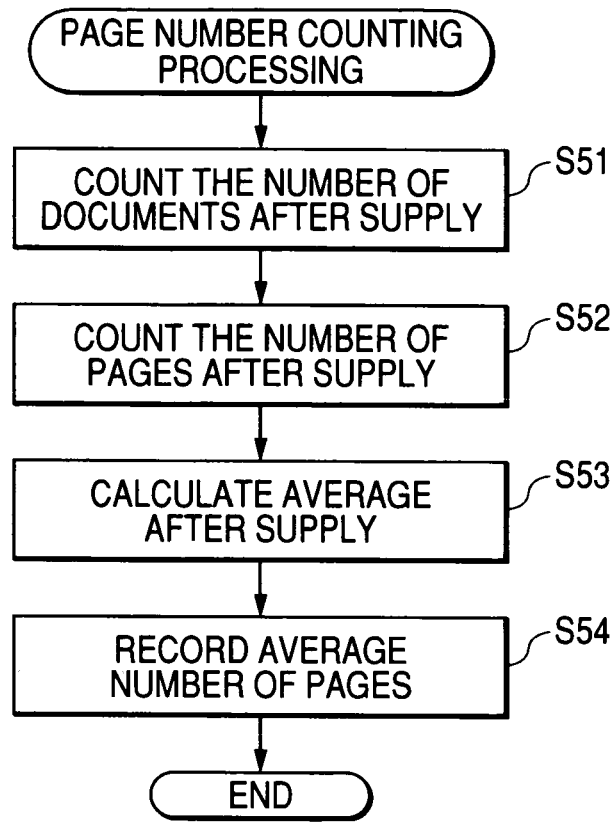
FIG. 21 is a flow chart showing a procedure of a page number counting processing.
Figure 22:
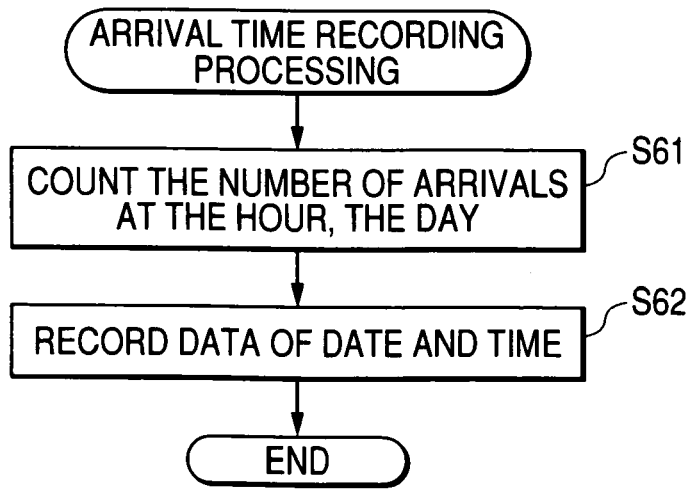
FIG. 22 is a flowchart showing a procedure of an arrival time recording processing.

Next, a procedure of page number counting performed in the arithmetic part 17 will be described with reference to a flowchart shown in FIG. 21. The arithmetic part 17 counts the number of documents after supply and the number of pages on the basis of the page number data sent from the image processing part 14 (steps S51 and S52), calculates an average of the number of pages after the supply, and records it (steps S53 and S54) Next, a procedure of arrival time recording performed in the arithmetic part 17 will be described with reference to a flowchart shown in FIG. 22. In the arithmetic part 17, on the basis of the storage completion time sent from the document storage part 12, the arrival numbers at the corresponding times and on the corresponding days are counted (step S61) and are recorded (step S62).

Figure 23:
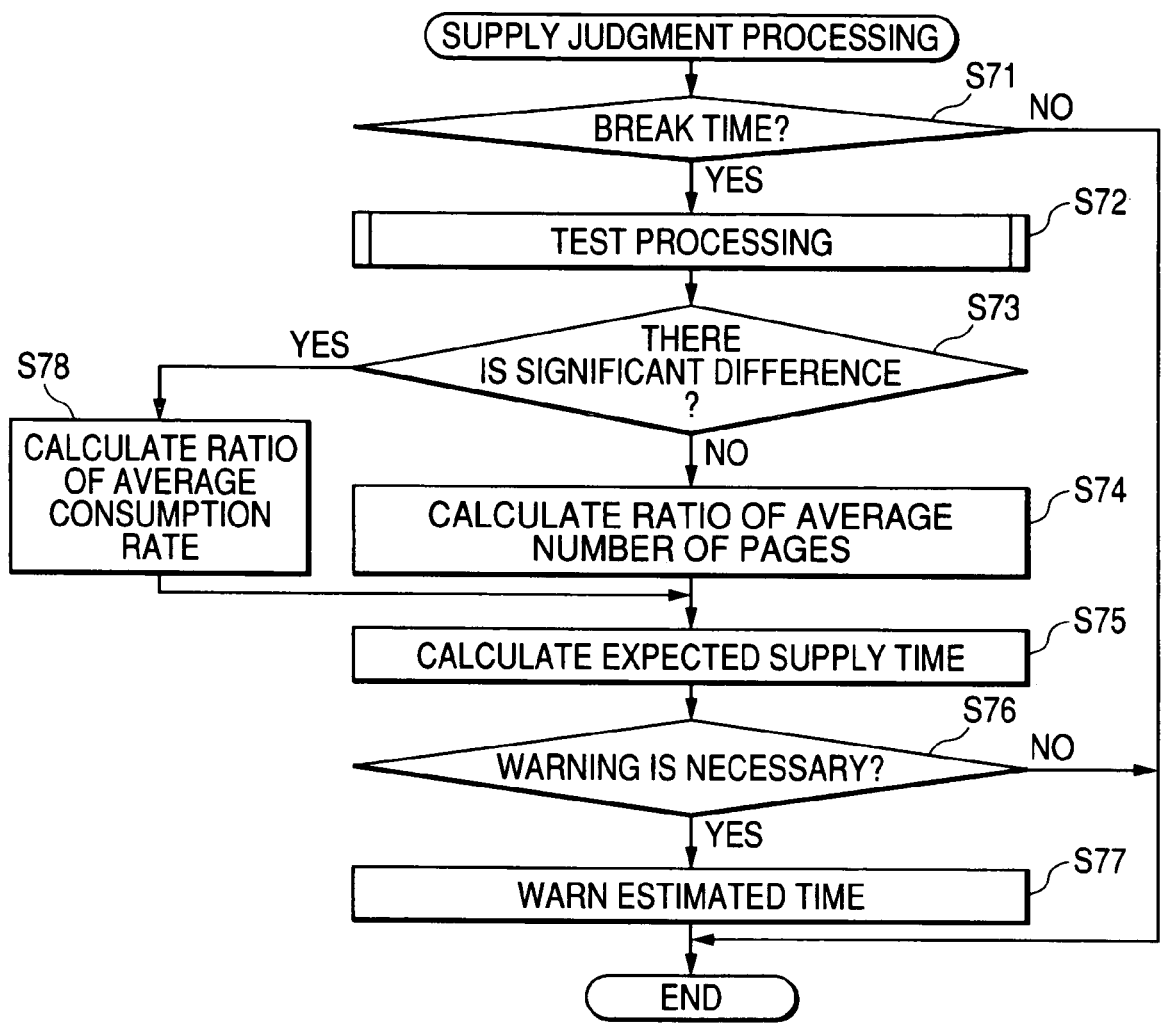
FIG. 23 is a flowchart showing a procedure of a supply judgment processing.

Next, a procedure of a supply judgment made in the arithmetic part 17 will be described with reference to a flowchart shown in FIG. 23. The arithmetic part 17 performs a supply judgment processing described below in an idling state in which a processing is not performed and between output processing of the respective documents. First, it is judged whether the time is a separation time such as 20th hour, 30th hour or 20th day (step S71), and in the case of the time other than the separation time (step S71/NO), the processing is ended. The separation time here is the timing when the test is performed, and since [number of classifications (number of counting sections) m×10] or more data are required in order to improve the accuracy of the test, it is assumed that the condition of 10 multiplied by the number of classifications (number of classifications≧2) is satisfied. In this embodiment, both the hour and the day are made objects, and there are a test timing on the hour and a test timing on the day.

Subsequently, the distribution goodness-of-fit test device 1 is controlled and the distribution goodness-of-fit test processing is performed (step S72). In the case where there is a significant difference by the distribution goodness-of-fit test processing (step S73/YES), since the arrival rate is different from that of the steady state, as an average consumption rate, an average arrival rate×the average number of document pages from the last supply is obtained, a ratio thereof to an average arrival rate×the average number of document pages in the steady state is calculated (step S78) an average supply time interval is multiplied by this, its result is added to the last supply time, and the final result is made an expected supply time (step S75).

In the case where there is no significant difference as a result of the test (step S73/NO), the arrival rate is assumed to be the same as that of the steady state, the ratio of the present average number of document pages to the average number of document pages of the steady state is calculated (step S74), an average supply time interval is multiplied by this, its result is added to the last supply time, and the final result is made an expected supply time (step S75). This expected supply time is compared with the present time, and when a remaining time is shorter than, for example, 1 week (step S76/YES), a warning of an expected time when supply is required and the like is issued through a panel of the notification part 16, and the user is urged to prepare (step S77).

SPECIFIC EXAMPLE 10

A specific example of the foregoing distribution goodness-of-fit test of step S72 will be described.

TABLE 24

| classification | observed frequency | expected frequency | $(X_i - n/m)^2 \div (n/m)$ |
|---|---|---|---|
| 1 | 10.15537162 | 10 | 0.002414 |
| 2 | 10.80104107 | 10 | 0.064167 |
| 3 | 9.043587307 | 10 | 0.091473 |
| total | 30 | 30 | 0.158053238 |

Table 23 shows an example of data in which the number of outputs in a working time of a printer is compared with a past average value as a steady state and a test is performed. As shown in Table 24, as a result of the test, because of $\chi^2(3-1, 0.05)=5.991476357>0.158053238$, it is understood that the number of outputs well matches the inhomogeneous Poisson process. Thus, in this embodiment, the supply timing is calculated by only the ratio of the average number of pages per document.

Incidentally, in the case of a printer having plural sheet trays, a statistic is obtained for each sheet and a test is performed, so that it is possible to distinguish supply timings for respective sheets. Similarly, in addition to the sheets, also with respect to toner or ink, a statistic is obtain for each color, a test is performed, and a warning of each supply timing can be issued. Besides, when these are notified to a supplier through a network, it is also easy to perform a service of delivery at a timing in conformity with a use state.

[Embodiment 4]

Next, embodiment 4 will be described. This embodiment is an embodiment of a distribution goodness-of-fittest program, and the processing of distribution goodness-of-fit test

TABLE 23

Figure 24:
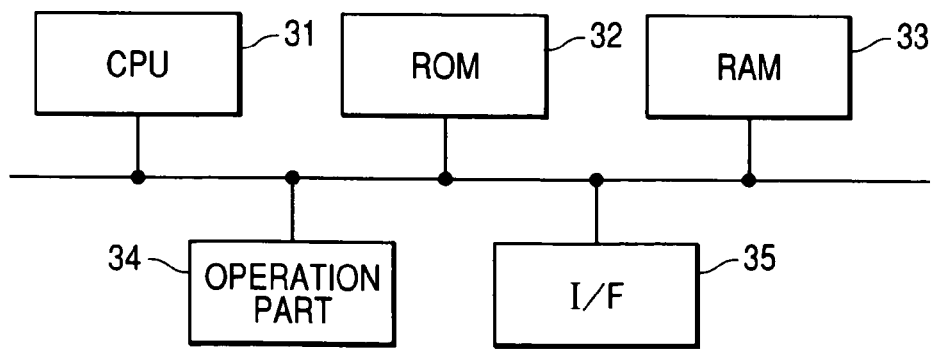
FIG. 24 is a view showing a whole structure of a computer for executing a program.

| | number of outputs | past average | cumulative probability (k − 1) | cumulative probability (k) | classification 1 | classification 2 | classification 3 |
|---|---|---|---|---|---|---|---|
| 1 | 1 | 7.5 | 0.869160654 | 0.92545308 | 0 | 0 | 1 |
| 2 | 4 | 4.6 | 0.333956325 | 0.522669677 | 0 | 1 | 0 |
| 3 | 0 | 2.7 | 0 | 0.06213403 | 1 | 0 | 0 |
| 4 | 3 | 2.3 | 0.602699718 | 0.80442588 | 0 | 0.317097932 | 0.682902068 |
| 5 | 2 | 2.8 | 0.236327697 | 0.47676273 | 0.403458827 | 0.596541173 | 0 |
| 6 | 2 | 3.2 | 0.175807333 | 0.387233126 | 0.745065198 | 0.254934802 | 0 |
| 7 | 3 | 3.6 | 0.30975747 | 0.523582864 | 0.110257547 | 0.889742453 | 0 |
| 8 | 5 | 5.5 | 0.366938354 | 0.539224429 | 0 | 1 | 0 |
| 9 | 6 | 7.3 | 0.273448721 | 0.41741302 | 0.415968491 | 0.584031509 | 0 |
| 10 | 1 | 3.3 | 0.038234436 | 0.163032352 | 1 | 0 | 0 |
| 11 | 6 | 7.5 | 0.250502744 | 0.389425499 | 0.596234859 | 0.403765141 | 0 |
| 12 | 7 | 4.6 | 0.82461197 | 0.909251438 | 0 | 0 | 0 |
| 13 | 2 | 2.7 | 0.254052001 | 0.500863353 | 0.32122239 | 0.67877761 | 0 |
| 14 | 1 | 2.3 | 0.102804915 | 0.33678089 | 0.98569842 | 0.01430158 | 0 |
| 15 | 4 | 2.8 | 0.698721965 | 0.852399349 | 0 | 0 | 1 |
| 16 | 2 | 3.2 | 0.175807333 | 0.387233126 | 0.745065198 | 0.254934802 | 0 |
| 17 | 1 | 3.6 | 0.02841757 | 0.129605366 | 1 | 0 | 0 |
| 18 | 7 | 5.5 | 0.695431365 | 0.816827164 | 0 | 0 | 1 |
| 19 | 13 | 7.3 | 0.966723209 | 0.98375412 | 0 | 0 | 1 |
| 20 | 3 | 3.3 | 0.366703716 | 0.588299429 | 0 | 1 | 0 |
| 21 | 9 | 7.5 | 0.673164923 | 0.785688293 | 0 | 0 | 1 |
| 22 | 3 | 4.6 | 0.168048797 | 0.333956325 | 0.996244948 | 0.003755052 | 0 |
| 23 | 3 | 2.7 | 0.500863353 | 0.720571589 | 0 | 0.754652246 | 0.245347754 |
| 24 | 3 | 2.3 | 0.602699718 | 0.80442588 | 0 | 0.317097932 | 0.682902068 |
| 25 | 1 | 2.8 | 0.062695189 | 0.2363227697 | 1 | 0 | 0 |
| 26 | 3 | 3.2 | 0.387233126 | 0.610295021 | 0 | 1 | 0 |
| 27 | 4 | 3.6 | 0.523582864 | 0.713927433 | 0 | 0.751709405 | 0.248290595 |
| 28 | 6 | 5.6 | 0.539224429 | 0.695431365 | 0 | 0.815855179 | 0.184144821 |
| 29 | 10 | 7.3 | 0.807461372 | 0.8850986685 | 0 | 0 | 1 |
| 30 | 2 | 3.3 | 0.163032352 | 0.366703716 | 0.836155747 | 0.163844253 | 0 | is performed by the processing of a computer device 30 shown in FIG. 24. As shown in FIG. 24, the computer device 30 includes a CPU 31, a ROM 32, a RAM 33, an operation part 34, an I/F part 35 and the like. The distribution goodness-of-fit test program is recorded in the ROM 32, and the CPU 31 reads out this program from the ROM 32 and executes the processing. The CPU 31 reads out measurement data and statistical data recorded in the RAM 33 and performs the distribution goodness-of-fit test processing in accordance with the flowchart shown in FIG. 5. In this way, also in this embodiment, the same effects as the foregoing respective embodiments can be obtained.

Incidentally, the foregoing embodiments are preferred embodiments of the present invention. However, the invention is not limited to these, but can be variously modified within the scope not departing from the gist of the invention. For example, in the foregoing embodiments, although the discrete distribution such as the inhomogeneous Poisson distribution and the binomial distribution has been described, even in a continuous distribution, when division into sections is performed and totalization is made, it can be treated as the discrete distribution, and therefore, the invention can be sufficiently applied.

As described above, some embodiments of the present invention are outlined below:

In the distribution goodness-of-fit test device of the present invention, the counting section determination unit determines the counting sections so that the widths of the respective counting sections have equal probabilities on the estimated probability distribution.

According to this invention, the counting sections are determined so that the widths of the respective counting sections have the equal probabilities on the estimated probability distribution. Accordingly, even if a distribution is such that a probability distribution varies temporally, the distribution is converted into a uniform distribution, and a goodness-of-fit test can be performed. Thus, the test possible range of the goodness-of-fit test can be widened.

In the distribution goodness-of-fit test device of the present invention, the counting section determination unit determines a specified division number m corresponding to the number of the measured data, divides the estimated probability distribution into equal probability sections each having a probability of 1/m, and determines the widths of the respective counting sections.

According to this invention, the division number m is determined according to the number of the measured data. In the case where the number of the data obtained by measurement is small, the division number is changed so that the test with high accuracy can be performed. Besides, the estimated probability distribution is divided into the equal probability sections each having the probability of 1/m and the widths of the respective counting sections are determined. Accordingly, even if the distribution is such that the probability distribution is changed temporally, the distribution is converted into the uniform distribution and the goodness-of-fit test can be performed. Thus, the test possible range of the goodness-of-fit test can be widened.

In the distribution goodness-of-fit test device of the present invention, in the case where a discrete value of the measurement data is k, the data counting unit judges the equal probability sections in which a cumulative probability of from 0 to k is included, and classifies the measurement data into the counting sections.

According to this invention, the cumulative probability of the discrete value is obtained, so that the measurement data can be classified into the counting sections.

In the distribution goodness-of-fit test device of the present invention, it is assumed that the measured data follows plural probability distributions, and the counting section determination unit changes the widths of the counting sections for each of the assumed probability distributions.

According to this invention, the widths of the counting sections are changed for each of the assumed probability distributions and the counting of data is performed, so that it is possible to cause the probabilities of the respective counting sections on the estimated probability distribution to become equal probabilities. Accordingly, even if the distribution is such that the probability distribution varies temporally, the distribution is converted into the uniform distribution and the goodness-of-fit test can be performed. Thus, the test possible range of the goodness-of-fit test can be widened.

In the distribution goodness-of-fit test device of the present invention, in a case where a discrete value of the measurement data extends over plural counting sections, the data counting unit divides the data into plural counting sections and counts.

According to this invention, in the case where the probability of taking the discrete value of the measurement data extends over the plural counting sections, the data is divided into the plural counting sections and is counted, so that an error can be made small.

In the distribution goodness-of-fit test device of the present invention, in a case where a discrete value of the measurement data extends over plural counting sections, the data counting unit obtains a rate at which a probability of taking the discrete value of the measurement data is included in the equal probability section, divides the measurement data into the plural counting sections, and counts.

According to this invention, the measurement data is divided into the plural counting sections according to the rate at which the probability of taking the discrete value of the measurement data is included in the respective counting sections and is counted. Accordingly, the measurement data can be divided into the plural counting sections with high accuracy, and the error can be made further small.

In the distribution goodness-of-fit test device of the present invention, the goodness-of-fit test unit tests the counted data by a chi-square goodness-of-fit test.

The counted data is tested by the chi-square goodness-of-fit test, so that the test can be performed using a generally used test method.

In the distribution goodness-of-fit test device of the present invention, the estimated probability distribution is a probability distribution varying temporally.

Even if the estimated probability distribution is the probability distribution varying temporally, the widths of the counting sections are determined so that the widths of the respective counting sections have equal probabilities on the estimated probability distribution, and therefore, the distribution is converted into a uniform distribution and the goodness-of-fit test can be performed.

In the distribution goodness-of-fit test device of the present invention, the estimated probability distribution follows a inhomogeneous Poisson process.

Even if the estimated probability distribution follows the inhomogeneous Poisson process, the goodness-of-fit test can be performed.

In the distribution goodness-of-fit test method of the present invention, the counting section determination step determines the counting sections so that the widths of the respective counting sections have equal probabilities on the estimated probability distribution.

According to this invention, the counting sections are determined so that the widths of the respective counting sections have the equal probabilities on the estimated probability distribution. Accordingly, even if a distribution is such that a probability distribution varies temporally, the distribution is converted into a uniform distribution, and a goodness-of-fit test can be performed. Thus, the test possible range of the goodness-of-fit test can be widened.

In the distribution goodness-of-fit test method of the present invention, it is assumed that the measured data follows plural probability distributions, and the counting section determination step determines the widths of the counting sections for each of the assumed probability distributions.

According to this invention, the widths of the counting sections are changed for each of the assumed probability distributions and the counting of the data is performed, so that it is possible to cause the probabilities of the respective counting sections on the estimated probability distribution to become equal probabilities. Accordingly, even if the distribution is such that the probability distribution varies temporally, the distribution is converted into the uniform distribution and the goodness-of-fit test can be performed. Thus, the test possible range of the goodness-of-fit test can be widened.

In the distribution goodness-of-fit test method of the present invention, in a case where a discrete value of the measurement data extends over plural counting sections, the data counting step divides the data into plural counting sections and counts.

According to this invention, in the case where the probability of taking the discrete value of the measurement data extends over the plural counting sections, the data is divided into the plural counting sections and is counted, so that an error can be made small.

In the storage medium readable by the computer and storing the distribution goodness-of-fit test program of the present invention, the counting section determination step determines the counting sections so that the widths of the respective counting sections have equal probabilities on the estimated probability distribution.

According to this invention, the counting sections are determined so that the widths of the respective counting sections have the equal probabilities on the estimated probability distribution. Accordingly, even if a distribution is such that a probability distribution varies temporally, the distribution is converted into a uniform distribution, and a goodness-of-fit test can be performed. Thus, the test possible range of the goodness-of-fit test can be widened.

In the storage medium readable by the computer and storing the distribution goodness-of-fit test program of the present invention, it is assumed that the measured data follows plural probability distributions, and the counting section determination step determines the widths of the counting sections for each of the assumed probability distributions.

According to this invention, the widths of the counting sections are changed for each of the assumed probability distributions and the counting of the data is performed, so that it is possible to cause the probabilities of the respective counting sections on the estimated probability distribution to become equal probabilities. Accordingly, even if the distribution is such that the probability distribution varies temporally, the distribution is converted into the uniform distribution and the goodness-of-fit test can be performed. Thus, the test possible range of the goodness-of-fit test can be widened.

In the storage medium readable by the computer and storing the distribution goodness-of-fit test program of the present invention, in a case where a discrete value of the measurement data extends over plural counting sections, the data counting step divides the data into plural counting sections and counts.

According to this invention, in the case where the probability of taking the discrete value of the measurement data extends over the plural counting sections, the data is divided into the plural counting sections and is counted, so that an error can be made small.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2004-183148 filed on Jun. 21, 2004 including specification, claims, drawings and abstract is incorporated herein by reference in its entirety.

What is claimed is:

1. A distribution goodness-of-fit test device for testing whether measured data matches an estimated probability distribution, comprising:
   a counting section determination unit that determines according to the number of the measured data, widths of counting sections for counting the measured data;
   a counting unit that counts the numbers of data in the respective determined counting sections and records the count of the numbers of data; and
   a goodness-of-fit test unit that performs a goodness-of-fit test based on the recorded numbers of data in the respective counting sections.

2. A distribution goodness-of-fit test device for testing whether measured data matches an estimated probability distribution, comprising:
   a counting section determination unit that determines, according to the estimated probability distribution, widths of counting sections for counting the measured data;
   a counting unit that counts the numbers of data in the respective determined counting sections and records the count of the numbers of data; and
   a goodness-of-fit test unit that performs a goodness-of-fit test based on the recorded numbers of data in the respective counting sections.

3. A distribution goodness-of-fit test device for testing whether measured data matches an estimated probability distribution, comprising:
   a counting section determination unit that determines, according to the estimated probability distribution and the number of the measured data, widths of counting sections for counting the measured data;
   a counting unit that counts the numbers of data in the respective determined counting sections and records the count of the numbers of data; and a goodness-of-fit test unit that performs a goodness-of-fit test based on the recorded numbers of data in the respective counting sections.

4. A distribution goodness-of-fit test device according to claim 1, wherein the counting section determination unit determines the counting sections, and the widths of the respective counting sections have equal probabilities on the estimated probability distribution.

5. A distribution goodness-of-fit test device according to claim 1, wherein the counting section determination unit determines a specified division number m corresponding to the number of the measured data, divides the estimated probability distribution into equal probability sections each having a probability of 1/m, and determines the widths of the respective counting sections.

6. A distribution goodness-of-fit test device according to claim 5, wherein when a discrete value of the measurement data is k, the counting unit judges the equal probability sections in which a cumulative probability of from 0 to k is included, and classifies the measurement data into the counting sections.

7. A distribution goodness-of-fit test device according to claim 1, wherein it is assumed that the measured data follows a plurality of probability distributions, and the counting section determination unit determines the widths of the counting sections for each of the assumed probability distributions.

8. A distribution goodness-of-fit test device according to claim 1, wherein when a discrete value of the measurement data extends over a plurality of counting sections, the counting unit divides the data into a plurality of counting sections and counts.

9. A distribution goodness-of-fittest device according to claim 6, wherein when a discrete value of the measurement data extends over a plurality of counting sections, the counting unit obtains a rate at which a probability of taking the discrete value of the measurement data is included in the equal probability sections, divides the measurement data into the a plurality of counting sections, and counts.

10. A distribution goodness-of-fit test device according to claim 1, wherein the goodness-of-fit test unit tests the counted data by a chi-square goodness-of-fit test.

11. A distribution goodness-of-fit test device according to claim 1, wherein the estimated probability distribution is a probability distribution varying temporally.

12. A distribution goodness-of-fit test device according to claim 1, wherein the estimated probability distribution follows a inhomogeneous Poisson process.

13. A consumable goods supply timing judgment device comprising:
a distribution goodness-of-fit test device for testing whether measured data matches an estimated probability distribution, further comprising:
a counting section determination unit that determines according to the number of the measured data, widths of counting sections for counting the measured data;
a counting unit that counts the numbers of data in the respective determined counting sections; and
a goodness-of-fit test unit that performs a goodness-of-fit test based on the numbers of data in the respective counting sections;
wherein the goodness-of-fit test from a measured consumption rate of consumable goods per unit time and an average value of a past consumption rate of the consumable goods per unit time, and
the consumable goods supply timing judgment device further comprising:
a control unit that calculates an estimated supply time from a ratio of a present consumption rate of the consumable goods to a past consumption rate of the consumable goods and notifying the estimated supply time when a difference between the present consumption rate and the past consumption rate is judged by the goodness-of-fit test.

14. An image forming device comprising:
a consumable goods supply timing judgment device comprising;
a distribution goodness-of-fit test device for testing whether measured data matches an estimated probability distribution, further comprising:
a counting section determination unit that determines according to the number of the measured data, widths of counting sections for counting the measured data;
a counting unit that counts the numbers of data in the respective determined counting sections; and
a goodness-of-fit test unit that performs a goodness-of-fit test based on the numbers of data in the respective counting sections;
wherein the goodness-of-fit test from a measured consumption rate of consumable goods per unit time and an average value of a past consumption rate of the consumable goods per unit time, and
the consumable goods supply timing judgment device further comprising:
a control unit that calculates an estimated supply time from a ratio of a present consumption rate of the consumable goods to a past consumption rate of the consumable goods and notifying the estimated supply time when a difference between the present consumption rate and the past consumption rate is judged by the goodness-of-fit test.

15. A distribution goodness-of-fit test method for testing whether measured data matches an estimated probability distribution, comprising:
determining, according to the estimated probability distribution and the number of the measured data, widths of counting sections for counting the measured data;
counting the numbers of data in the respective determined counting sections and recording the count of the numbers of data; and
performing a goodness-of-fit test based on the numbers of data in the respective counting sections.

16. A distribution goodness-of-fit test method according to claim 15, wherein the widths of the respective counting sections have equal probabilities on the estimated probability distribution by determining the counting sections.

17. A distribution goodness-of-fit test method according to claim 15, wherein it is assumed that the measured data follows a plurality of probability distributions, and the widths of the counting sections are determined based on each of the assumed probability distributions.

18. A distribution goodness-of-fit test method according to claim 15, wherein when a discrete value of the measurement data extends over a plurality of counting sections, the data is divided by a plurality of counting sections and being counted.

19. A storage medium readable by a computer and storing a distribution goodness-of-fit test program of instructions executable by the computer to perform a function for testing whether measured data matches an estimated probability distribution, the function comprising:
determining, according to the estimated probability distribution and the number of the measured data, widths of counting sections for counting the measured data;

counting the numbers of data in the respective determined counting sections and recording the count of the numbers of data; and performing a goodness-of-fit test using the numbers of data in the respective counting sections.

20. A storage medium readable by a computer and storing a distribution goodness-of-fit test program according to claim 19, wherein the widths of the respective counting sections have equal probabilities on the estimated probability distribution by determining the counting sections.

21. A storage medium readable by a computer and storing a distribution goodness-of-fit test program according to claim 19, wherein it is assumed that the measured data follows a plurality of probability distributions, and the widths of the counting sections are determined based on each of the assumed probability distributions.

22. A storage medium readable by a computer and storing a distribution goodness-of-fit test program according to claim 19, wherein when a discrete value of the measurement data extends over a plurality of counting sections, the data is divided by a plurality of counting sections and being counted.

* * * * *